US012294151B2

(12) United States Patent
Petersson et al.

(10) Patent No.: US 12,294,151 B2
(45) Date of Patent: May 6, 2025

(54) INLINE SLOTTED WAVEGUIDE ANTENNA

(71) Applicant: Gapwaves AB, Gothenburg (SE)

(72) Inventors: Julius Petersson, Gothenburg (SE);
Abolfazl Haddadi, Gothenburg (SE);
Abbas Vosoogh, Gothenburg (SE)

(73) Assignee: Gapwaves AB, Gothenburg (SE)

( * ) Notice: Subject to any disclaimer, the term of this patent is extended or adjusted under 35 U.S.C. 154(b) by 130 days.

(21) Appl. No.: 18/002,887

(22) PCT Filed: Jun. 11, 2021

(86) PCT No.: PCT/EP2021/065803
§ 371 (c)(1),
(2) Date: Dec. 22, 2022

(87) PCT Pub. No.: WO2021/259674
PCT Pub. Date: Dec. 30, 2021

(65) Prior Publication Data
US 2023/0253717 A1 Aug. 10, 2023

(30) Foreign Application Priority Data
Jun. 23, 2020 (SE) ...................................... 2030209

(51) Int. Cl.
*H01Q 17/00* (2006.01)
*H01Q 1/52* (2006.01)
(Continued)

(52) U.S. Cl.
CPC ........... *H01Q 17/001* (2013.01); *H01Q 1/523* (2013.01); *H01Q 13/10* (2013.01); *H01Q 21/06* (2013.01)

(58) Field of Classification Search
USPC ....................................................... 343/702
See application file for complete search history.

(56) References Cited

U.S. PATENT DOCUMENTS 6,933,881 B2 * 8/2005 Shinoda ............... H01Q 1/3233
342/70
11,171,399 B2 * 11/2021 Alexanian ................. G01S 3/40
(Continued)

FOREIGN PATENT DOCUMENTS

WO WO-2013078976 A1 * 6/2013 ............... H01P 1/20
WO 2020048845 A1 3/2020

OTHER PUBLICATIONS

International Search Report (PCT/ISA/210) and Written Opinion (PCT/ISA/237) mailed on Oct. 5, 2021, by the European Patent Office as the International Searching Authority for International Application No. PCT/EP2021/065803.

*Primary Examiner* — Hoang V Nguyen
*Assistant Examiner* — Brandon Sean Woods
(74) *Attorney, Agent, or Firm* — BUCHANAN INGERSOLL & ROONEY PC

(57) ABSTRACT

An antenna arrangement having a stacked layered structure. The antenna arrangement including a radiation layer having a surface. The surface is delimited by a surface boundary. A first and a second slot extend along a first slot axis and second slot axis, respectively, and are arranged on the surface. The antenna arrangement also includes a distribution layer facing the radiation layer. The distribution layer is arranged to distribute a radio frequency signal to the first and second slots. The distribution layer includes a distribution layer feed and a ridge arranged to form a first ridge waveguide intermediate the distribution layer and the radiation layer. The ridge includes a first section connected to a second section via a curved section. The first section extends along a first ridge axis and the second section extends along a second ridge axis different from the first ridge axis.

28 Claims, 25 Drawing Sheets

(51) Int. Cl.
    *H01Q 13/10*     (2006.01)
    *H01Q 21/06*     (2006.01)

(56) References Cited

U.S. PATENT DOCUMENTS

| | | | |
|---|---|---|---|
| 11,539,145 B2 * | 12/2022 | Wu | H01Q 13/04 |
| 2019/0379132 A1 | 12/2019 | Pelletti et al. | |
| 2020/0185802 A1 * | 6/2020 | Vilenskiy | H01P 1/20 |

* cited by examiner

INLINE SLOTTED WAVEGUIDE ANTENNA

TECHNICAL FIELD

The present disclosure relates to waveguide antenna arrays. There are disclosed antenna arrangements with improved radiation patterns. The disclosed antenna array is suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency (RF) signals, i.e. electromagnetic signals.

The radiation arrangement of a transceiver often comprises an antenna array, since an array allows high control of shaping the radiation pattern, e.g. for high directivity, beam steering, and/or multiple beams. Antenna arrays can be based on slotted waveguide antennas (SWG), which comprise a compact integrated feed network with low loss and matching capabilities. Manufacturing tolerances, however, become problematic as the frequency increases since the physical dimensions of the antenna decreases. This is especially problematic at millimeter wave frequencies. To overcome this, the feed network can be based on electromagnetic bandgap, EBG, structures, e.g. ridge gap waveguides.

In some RF applications, the radiation pattern in the elevation dimension of the antenna arrangement should comprise a single narrow beam and the radiation pattern in the azimuth dimension of the antenna arrangement should be uniform over the field of view. This can easily be accomplished by an array of ideal slot antennas. Real slot antenna arrangements, however, present a trade-off between the azimuth beam width and a ripple in the azimuth radiation pattern. A narrow azimuth beam width with low ripple reduces the field of view. A wider beam width with larger ripple, on the other hand, transmits different amounts of power across the beam. Furthermore, real slot antenna arrangements present undesired sidelobes in the elevation direction. These side lobes levels in the elevation direction are typically large when the azimuth angle is large.

There is a need for antenna arrangements with improved radiation patterns which are easy to manufacture.

SUMMARY

It is an object of the present disclosure to provide antenna arrangements with improved radiation patterns which are easy to manufacture.

This object is at least in part obtained by an antenna arrangement having a stacked layered structure. The antenna arrangement comprises a radiation layer having a surface. The surface is delimited by a surface boundary. A first and a second slot extend along a first slot axis and second slot axis, respectively, and are arranged on the surface. The antenna arrangement also comprises a distribution layer facing the radiation layer. The distribution layer is arranged to distribute a radio frequency signal to the first and second slots. The distribution layer comprises a distribution layer feed and a ridge arranged to form a first ridge waveguide intermediate the distribution layer and the radiation layer.

The ridge comprises a first section connected to a second section via a curved section. The first section extends along a first ridge axis and the second section extends along a second ridge axis different from the first ridge axis. The first slot is arranged facing the first section with the first slot arranged offset from the first ridge axis in a direction towards the second ridge axis. The second slot is arranged facing the second section with the second slot arranged offset from the second ridge axis in a direction towards the first ridge axis.

This results in a more symmetric placement of the slots compared to prior art and therefore results in a radiation pattern with lower side lobe levels. The displacement of the ridge may optionally be done in combination with displacing the slots relative to a single line, which also results in a more symmetric placement of the slots compared to prior art.

In an example antenna arrangement with the first and a second slots extend in the same direction, and where the elevation dimension coincides with the extension direction of the slots. The radiation pattern has lower side lobe levels, especially in the elevation direction for large values of azimuth. The radiation pattern in the elevation dimension of the example antenna arrangement is also more symmetrical around the elevation angle zero, which is an advantage. Furthermore, example antenna arrangement presents more symmetrical radiation pattern in the azimuth dimension, especially for large values of the elevation angle. The radiation pattern is also more uniform in the azimuth dimension (in contrast to a directive pattern), which is an advantage.

In an example array comprising the disclosed antenna arrangement where slots extend in the same direction, the different columns of in the array present radiation patterns with less deviation relative to each other compared to prior art, which is an advantage. In other words, the radiation pattern of a column in the example array is barely affected by the column's position in the array, which is an advantage.

According to aspects, the curved section arranges the first ridge axis between 0 degrees and 45 degrees relative to the second ridge axis. Preferably, the first and second slot axes are parallel. Also, preferably, the first and second slots have the same slot axis. In addition, the first and second ridge axes are preferably parallel. Furthermore, the ridge preferably comprises a first straight section connected to a second straight section. This way, the antenna arrangement can present a radiation pattern that comprise a single narrow beam in the elevation dimension and a uniform over the field of view in the azimuth dimension.

According to aspects, the ridge comprises three or more sections and wherein the radiation layer comprises a respective slot facing each section. This can form an array.

According to aspects, every other section of the ridge extends along the same axis. According to other aspects, the distribution layer comprises a plurality of ridges. According to different aspects, the distribution layer feed is arranged in between two ridges. This provides an efficient and simple way to form an array.

According to aspects, a waveguiding path of the first ridge waveguide is arranged to match the shape of the first ridge. Having the waveguiding path match the shapes of the ridge provides a more constant characteristic of the waveguide along the path compared to a straight waveguide. This provides substantially better electromagnetic coupling from the waveguides to the respective slots. This, in turn, enables a better control of the radiation pattern, e.g., to further reduce ripples in the radiation pattern.

According to aspects, a distance from a side wall to the ridge in one of the ridge waveguides, measured in a cross section the waveguide, varies less than 30 percent, preferably less than 20 percent, and more preferably less than 10 percent, along the first ridge waveguide. This provides better impedance matching along the waveguide. In other words, the side walls extend along the same or in a similar direction as the extension direction (or tangent) of a section of the ridge. Preferably, the distances between the ridge and the side wall on respective sides of ridge are equal, i.e., at a particular point along the ridge, the distance from the ridge to the side wall on one side is equal to the distance from the ridge to the sidewall on the other side. This provides a symmetry to the ridge waveguide, which is an advantage. Measuring the distance in a cross section the waveguide can be described as the having the distance between the sidewall and the ridge measured along the surface of the distribution layer and substantially perpendicular to a tangent of the ridge.

According to aspects, the distribution layer comprises a first and a second ridge, where the distribution layer feed is arranged in between the first and second ridges, wherein a connection section of the first ridge is arranged offset from a center line of the distribution layer feed, and a connection section of the second ridge is arranged offset from the center line of the distribution layer feed, wherein the connection sections are arranged to guide electromagnetic waves form the distribution layer feed to the respective ridges. This may facilitate offsetting the first and second slots in different directions without changing the distance between slots or without changing the width of the ridge.

According to aspects, the antenna comprising one or more surface current suppressing members arranged on the surface. The one or more surface current suppressing members are arranged to suppress a surface current from a slot to the surface boundary. The suppressed surface currents result in an improved radiation pattern. For example, in an example antenna arrangement with the first and a second slots extend in the same direction, the radiation pattern can present a main lobe that is wide with a lower ripple in the azimuth dimension (the elevation dimension coincides with the extension direction of the slots).

According to aspects, the one or more surface current suppressing members comprise one or more grooves. This way, a simple and effective way of suppressing surface currents from a slot to the surface boundary According to aspects, the distribution layer comprises a first electromagnetic bandgap, EBG, structure. The ridge and the first EBG structure are arranged to form at least one first ridge gap waveguide intermediate the distribution layer and the radiation layer. The first EBG structure is also arranged to prevent electromagnetic waves (i.e., electromagnetic propagation) in a frequency band of operation from propagating from the at least one first ridge gap waveguide in directions other than through the at least one distribution layer feed and the at least two slots. EBG structures allow compact designs, low loss, low leakage between adjacent waveguides, and forgiving manufacturing and assembling tolerances. Furthermore, there is no need for electrical contact between the radiation layer and the distribution layer. This is an advantage since high precision assembly is not necessary and since electrical contact need not be verified.

According to aspects, the first EBG structure comprises a repetitive structure of protruding elements. This is a simple and effective type of EBG structure.

According to aspects, the antenna arrangement comprising a printed circuit board, PCB, layer and a shield layer. The PCB layer comprises at least one PCB layer feed and faces the distribution layer and the shield layer faces the PCB layer.

According to aspects, the shield layer comprises a second EBG structure arranged to form at least one second waveguide intermediate the shield layer and the PCB layer. The second EBG structure is also arranged to prevent electromagnetic waves (i.e., electromagnetic propagation) in a frequency band of operation from propagating from the at least one second wave guide in directions other than through the at least one PCB layer feed. The second EBG structure allows a compact design with low loss and low leakage, i.e. unwanted electromagnetic propagation between, e.g., adjacent waveguides or between adjacent RFICs on the PCB layer. Furthermore, the second EBG structure shields the PCB layer from electromagnetic radiation outside of the antenna arrangement.

This way,

According to aspects, the second EBG structure comprises a repetitive structure of protruding elements and the PCB layer comprises a ground plane and at least one planar transmission line. This forms at least one second gap waveguide intermediate the shield layer and the PCB layer. This is a simple and effective type of EBG structure.

There is also disclosed herein a telecommunication or radar transceiver comprising the antenna arrangement. Furthermore, there is disclosed herein a vehicle comprising the antenna arrangement.

There is also disclosed herein a method for designing an antenna arrangement having a stacked layered structure. The antenna arrangement comprises a radiation layer having a surface. The surface is delimited by a surface boundary. The antenna arrangement comprises a distribution layer facing the radiation layer. The method comprises arranging a first and a second slot extending along a first slot axis and second slot axis, respectively, on the surface. The method further comprises arranging the distribution layer to distribute a radio frequency signal to the first and second slots. The method also comprises arranging a distribution layer feed and a ridge on the distribution layer to form a first ridge waveguide intermediate the distribution layer and the radiation layer. The method further comprises connecting a first section of the ridge to a second section via a curved section, such that the first section extends along a first ridge axis and the second section extends along a second ridge axis different from the first ridge axis. The method also comprises arranging the first slot to face the first section with the first slot offset from the first ridge axis in a direction towards the second ridge axis, and arranging the second slot to face the second section with the second slot offset from the second ridge axis in a direction towards the first ridge axis.

According to aspects, the method further comprises arranging one or more surface current suppressing members on the surface, wherein the one or more surface current suppressing members are arranged to suppress a surface current from a slot to the surface boundary.

According to aspects, the one or more surface current suppressing members comprise one or more grooves.

According to aspects, the method further comprises arranging a first electromagnetic bandgap, EBG, structure on the distribution layer, such that the ridge and the first EBG structure form at least one first ridge gap waveguide intermediate the distribution layer and the radiation layer, also such that the first EBG structure prevent electromagnetic waves (i.e., electromagnetic propagation) in a frequency band of operation from propagating from the at least one first ridge gap waveguide in directions other than through the at least one distribution layer feed and the at least two slots.

According to aspects, the first EBG structure comprises a repetitive structure of protruding elements.

The methods disclosed herein are associated with the same advantages as discussed above in connection to the different measurement devices. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where FIG. 1 schematically illustrates an exploded view of an example antenna arrangement.

DETAILED DESCRIPTION

Figure 1:
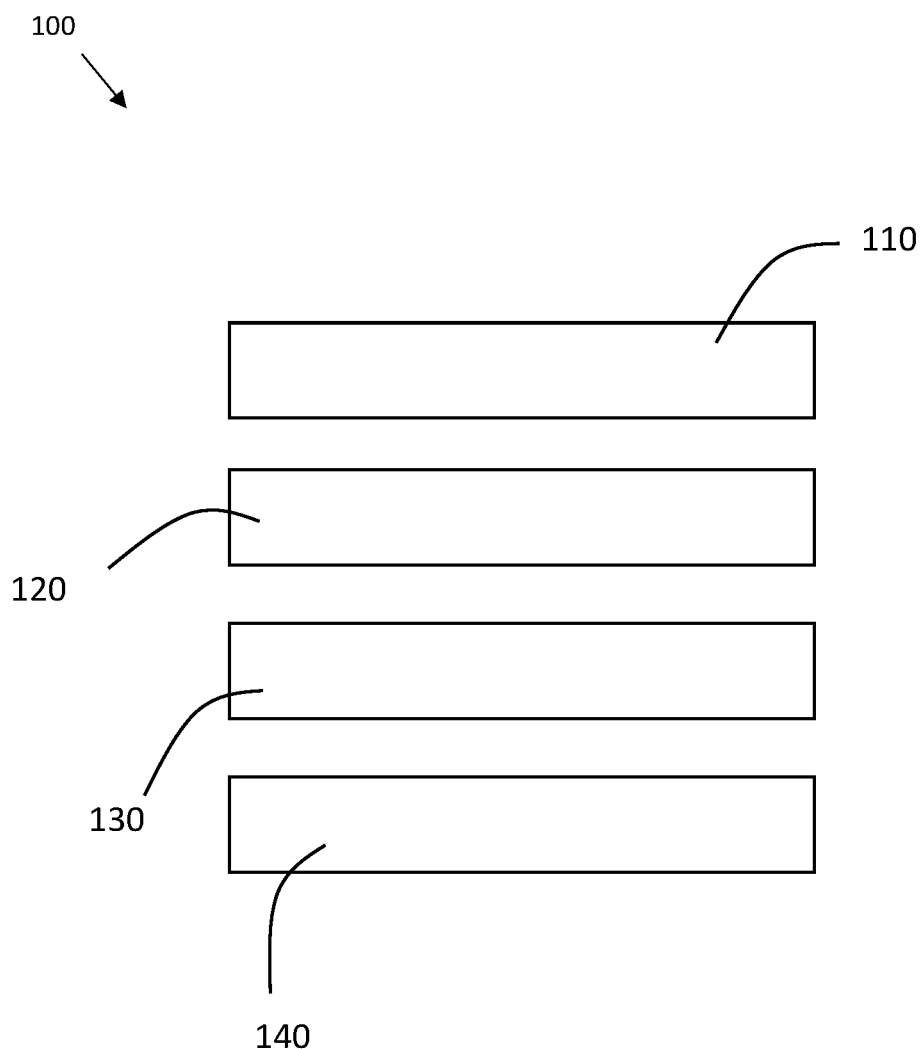

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 shows an antenna arrangement 100 having a stacked layered structure. A stacked layered structure is a structure comprising a plurality of planar elements referred to as layers. Each planar element has two sides, or faces, and is associated with a thickness. The thickness is much smaller than the dimension of the faces, i.e., the layer is a flat or approximately planar element. According to some aspects, a layer is rectangular or square. However, more general shapes are also applicable, including circular or elliptical disc shapes. The stacked layered structure is stacked in the sense that layers are arranged on top of each other. In other words, the layered structure can be seen as a sandwich structure.

The disclosed antenna arrangements 100 may be used for radar transceivers, such as vehicle radar transceivers, or for other radio frequency applications, such as communication systems, positioning systems etc. Therefore, there is disclosed herein a telecommunication or radar transceiver comprising the antenna arrangement 100. There is also disclosed herein a vehicle comprising the disclosed antenna arrangements 100.

The antenna arrangement in FIG. 1 comprises a radiation layer 110 with a plurality of radiation elements 111, 112 (not shown in FIG. 1) and a distribution layer 120. In general, the distribution layer 120 distributes one or more radio frequency signals to and from one or more radiation elements in the plurality of radiation elements. Generally, a stacked layered structure antenna arrangement comprises a printed circuit board, PCB, layer 130 and a shield layer 140.

One example of a radiation element is a slot and one example combination of a radiation layer and a distribution layer is a slotted waveguide antenna (SWA). A SWA commonly comprises a rectangular waveguide with a plurality of slots arranged elongated in a line along the broadside wall of the waveguide. This broadside can be seen as the radiation layer 110 and rest of the waveguide can be seen as the distribution layer 120. The slots are commonly rectangular or elliptical with a length about half the free-space wavelength, and with a width substantially shorter than the length, e.g. a tenth of the length. Other slot shapes that are substantially rectangular are also possible, e.g. a dumbbell shape. The spacing between the centers of adjacent slots is about half a guide wavelength, which is the distance between two planes of equal phase along a side of the waveguide. To control the electromagnetic coupling into each slot from a radio frequency (RF) signal along the waveguide, each slot may be individually displaced from a centerline along the broadside of the waveguide, i.e. arranging the center of each slot at a distance from the centerline. This can also be seen as controlling the matching between the waveguide and the slot. The excitation to each slot, i.e. the coupling to each slot, affects the side lobe level (SSL) in the radiation pattern from the array of slots in the waveguide. The far field radiation pattern of an antenna arrangement typically comprises a main lobe, which is a global maximum, i.e. a lobe continuing the highest power. A sidelobe is a lobe associated with a local maximum. To minimize the SSL in an SWA, the individual displacement of each slot can be optimized, which can include starting off from a known distribution, such as a Chebyshev distribution. To maintain high antenna efficiency, the slots are commonly arranged on alternating sides of the centerline.

Figure 2:
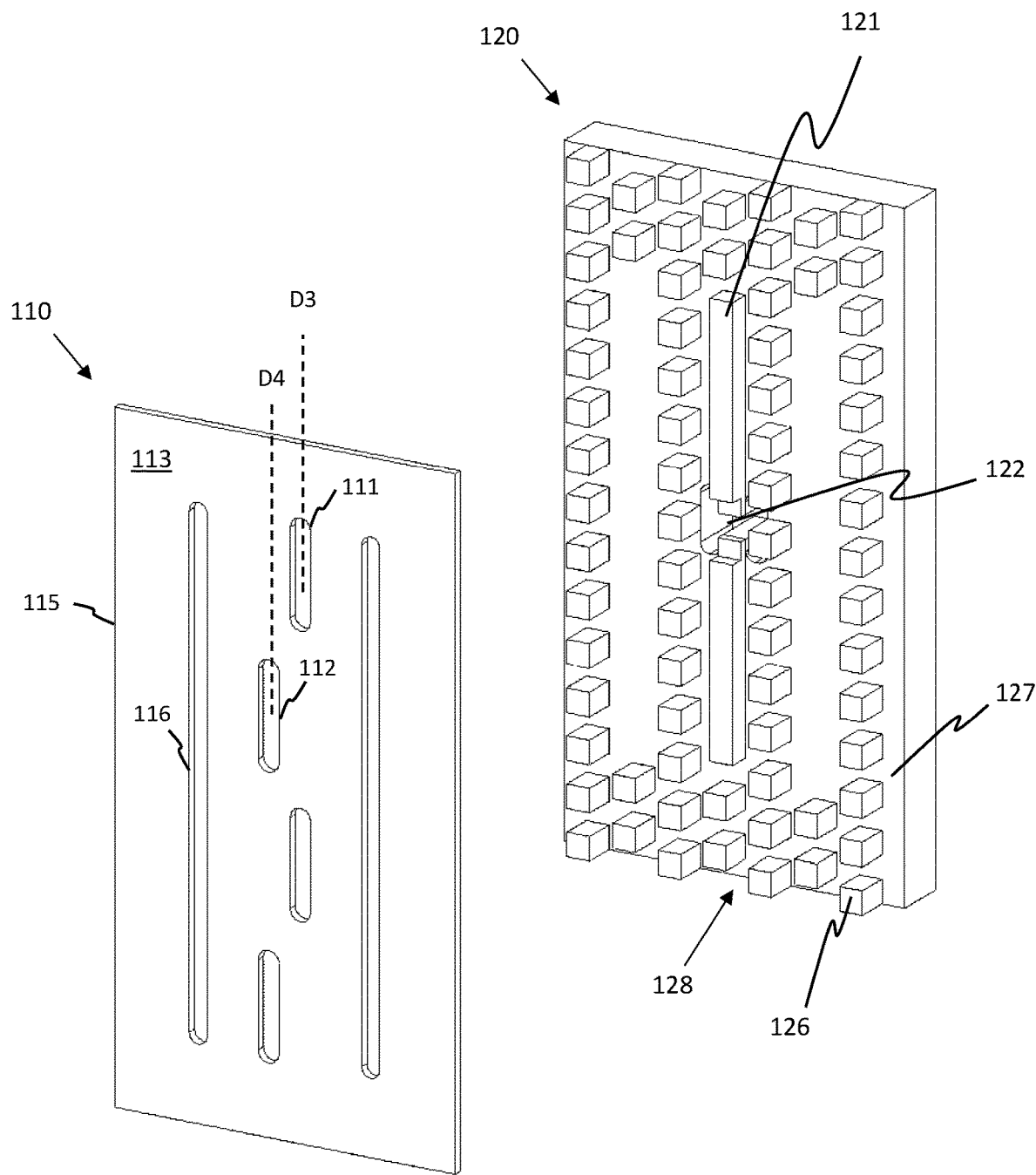
FIG. 2 shows an exploded view of an example antenna arrangement.

A slot antenna arrangement may alternatively be based on a ridge waveguide, as is shown in FIG. 2, which comprises a regular waveguide with an internal ridge along the centerline of one broadside of the waveguide, where the slots are arranged on the opposite broadside. Slots being elongated along the broadside in a slotted waveguide antenna should be placed facing the edge of the ridge to be effectively excited. Such slots should have a spacing of half a guide wavelength apart and should be arranged alternately displaced along the centerline of the ridge, i.e. every second slot face the same edge of the ridge and the rest of the slots face the opposite edge of the ridge. This way, all slots are fed with similar phase of the RF-signal along the waveguide. All slots could be arranged facing the same edge, but must in that case be arranged two guide wavelengths apart to be fed with a similar phase. This, however, results in grating lobes and is therefore an unviable option. As for the SWA, the displacements of each slot can be selected for minimal SSL.

Figure 3:
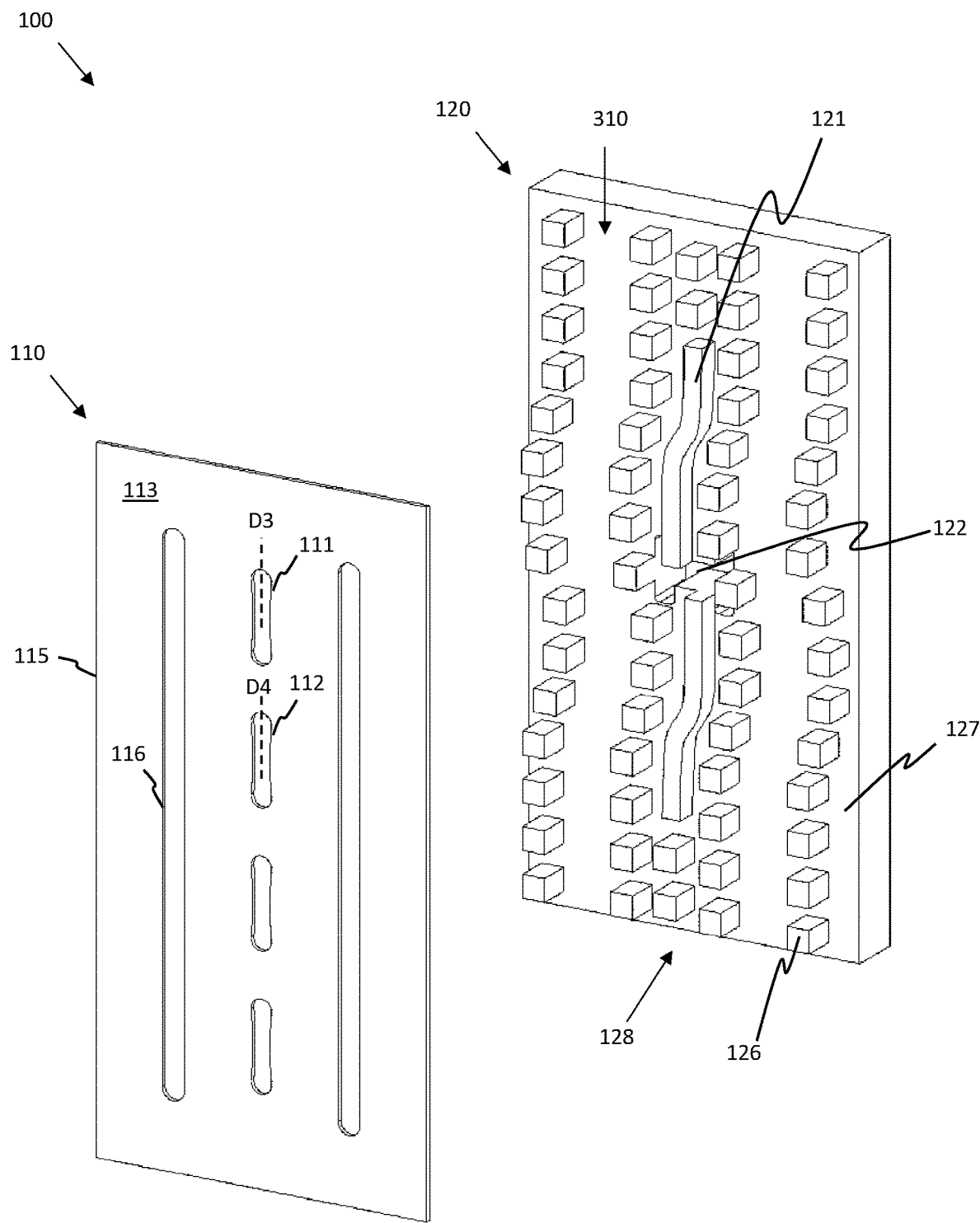
FIG. 3 shows an exploded view of an example antenna arrangement.

The disclosed antenna arrangement 100, shown in FIG. 3, displaces sections of the ridge relative to each slot in an antenna arrangement based on a ridge waveguide. In one embodiment of the invention, all slots are placed on a line. This results in a more symmetric placement of the slots compared to prior art and therefore results in a radiation pattern with lower SSL, especially in the elevation direction for large values of azimuth. The displacement of the ridge may optionally be done in combination with displacing the slots relative to a single line, which also results in a more symmetric placement of the slots compared to prior art.

In other words, there is herein disclosed an antenna arrangement 100 having a stacked layered structure. With references to FIGS. 1, 3, and 7, the disclosed antenna arrangement 100 comprises a radiation layer 110 having a surface 113. The surface 113 is delimited by a surface boundary 115. A first 111 and a second slot 112 are arranged on the surface and extend along a first slot axis D3 and second slot axis D4, respectively. The antenna arrangement also comprises a distribution layer 120 facing the radiation layer 110. The distribution layer 120 is arranged to distribute a radio frequency signal to the first 111 and second slots 112. The distribution layer 120 comprises a distribution layer feed 122 and a ridge 121 arranged to form a first ridge waveguide intermediate the distribution layer 120 and the radiation layer 110. The ridge 121 comprises a first section 124 connected to a second section 125 via a curved section 123. The first section 124 extends along a first ridge axis D1 and the second section 125 extends along a second ridge axis D2 different from the first ridge axis D1. The first slot 111 is arranged facing the first section 124 with the first slot axis D3 arranged offset A1 from the first ridge axis D1 in a direction towards the second ridge axis D2. The second slot 112 is arranged facing the second section 125 with the second slot axis D4 arranged offset A2 from the second ridge axis D2 in a direction towards the first ridge axis D1.

However, the feature of the first slot axis D3 being arranged offset A1 from the first ridge axis D1 is to be given a broad interpretation encompassing also implementations where the axes are not parallel, i.e., cases where the ridge 121 comprises a first section 124 connected to a second section 125 via a curved section 123, the first section 124 extending along a first ridge axis D1 and the second section 125 extending along a second ridge axis D2 different from the first ridge axis D1, wherein the first slot 111 is arranged facing the first section 124 with the first slot arranged offset A1 from the first ridge axis D1 in a direction towards the second ridge axis D2, and wherein the second slot 112 is arranged facing the second section 125 with the second slot arranged offset A2 from the second ridge axis D2 in a direction towards the first ridge axis D1.

The general idea of the arrangement is to have a more symmetric placement of the slots compared to prior art, which results in an improved radiation pattern. Thus, it is appreciated that a possible implementation of the above geometry may comprise a realization where a geometrical center of the first slot is offset from the first ridge axis D1 in a direction towards the second ridge axis D2, where the slot may or may not extend in a direction parallel to the first and/or the second ridge axes. The same applies, mutatis mutandis, to the second slot. In all of these geometries, the advantageous effect of a symmetrical arrangement of the slots is obtained, albeit possibly at different degrees, i.e., some of the geometries comprised within the herein stated definitions may have slightly better performance compared to other geometries, which are still usable.

Figure 15:
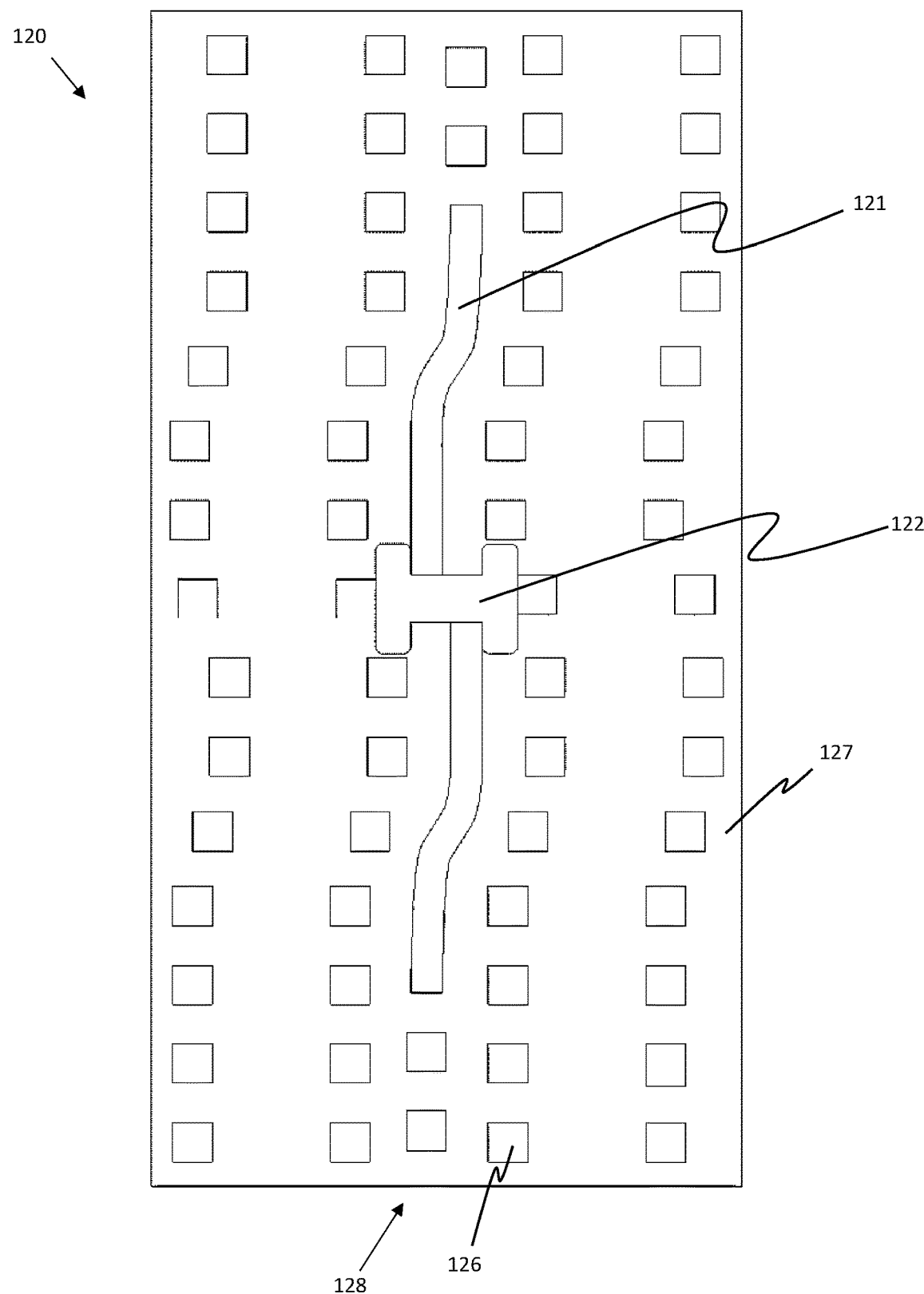
FIG. 15 shows a top view of the distribution layer from the example antenna arrangement from FIG. 3.

FIGS. 2 and 3 show example antenna arrangements. These antenna arrangements comprise four slots extending in a single direction on the radiation layer. In these two examples, one distribution layer feed is arranged in between two ridges. Each ridge couples the electromagnetic signal to two slots, respectively. In FIG. 2, both ridges extend on a single axis. To avoid grating lobes, the slots must be arranged alternately displaced along the centerline of the ridges. This way, every other slot faces opposite edges of the ridge. In FIG. 3, on the other hand, the slots are arranged on a single axis and the ridges are arranged in a way that sections of the ridge are displaced such that every other slot faces opposite edges of the ridge. FIG. 15 shows a top view of the distribution layer from FIG. 3.

Figure 4A:
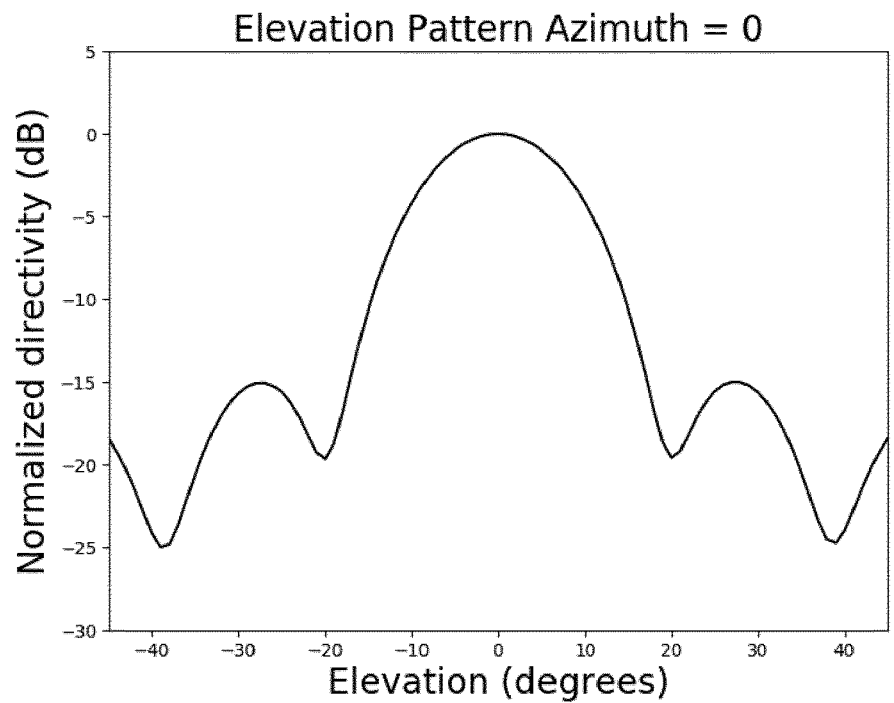
FIGS. 4A-F show different cuts of the radiation pattern of the example antenna arrangement of FIG. 2, FIGS. 5A-F show different cuts of the radiation pattern of the example antenna arrangement of FIG. 3, FIG. 6A-B show example ridge and slot configurations.
Figure 4B:
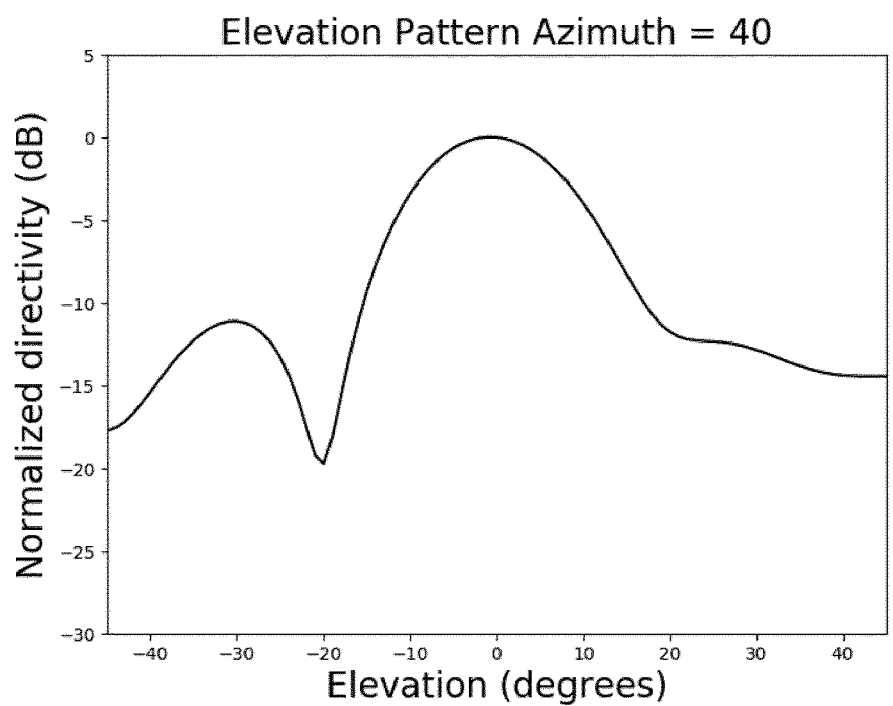
Figure 4C:
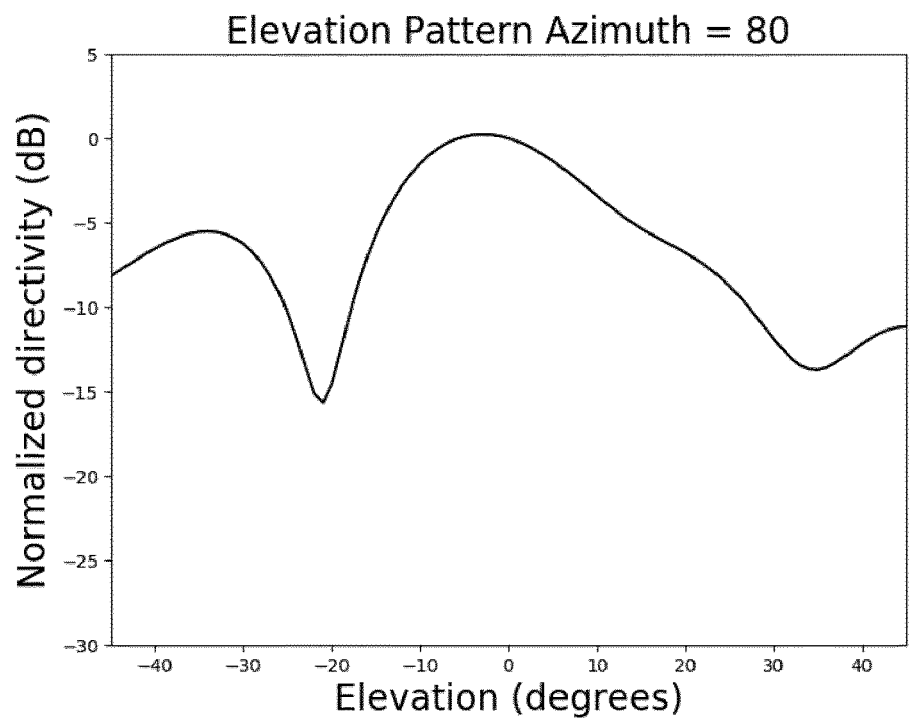
Figure 4D:
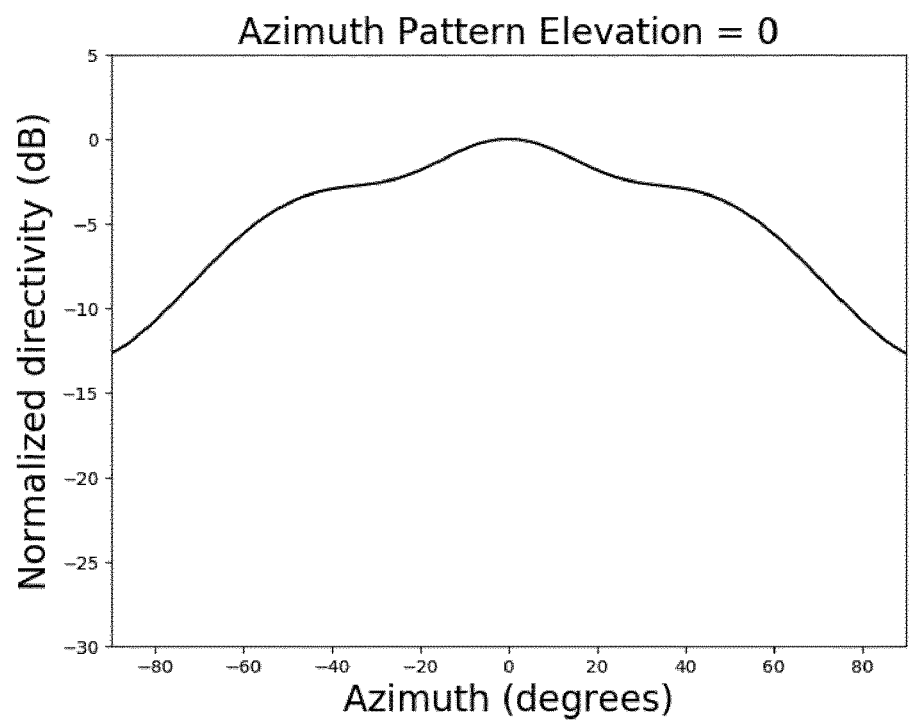
Figure 4E:
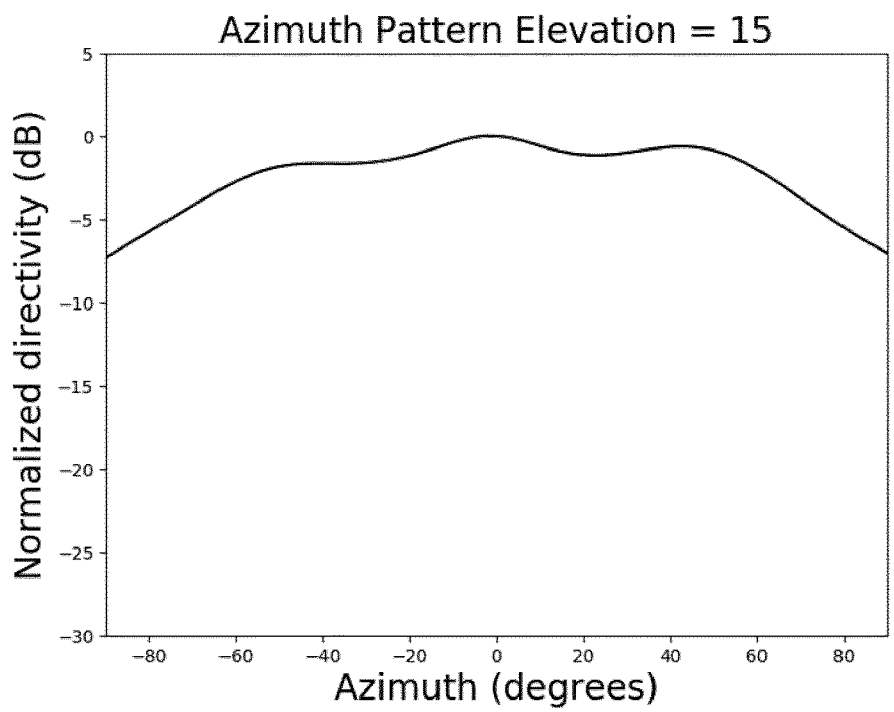
Figure 4F:
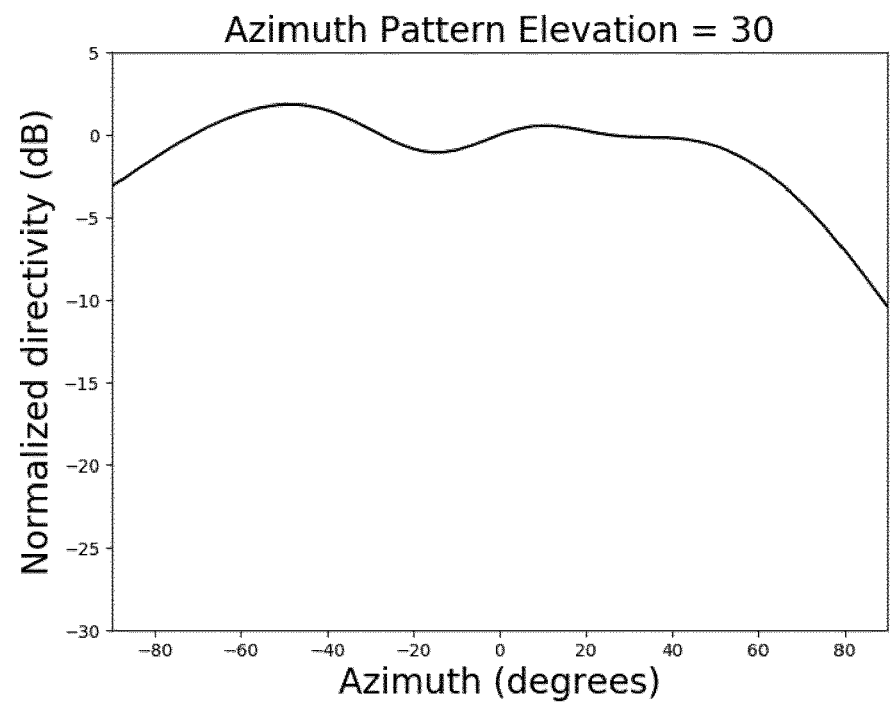
Figure 5A:
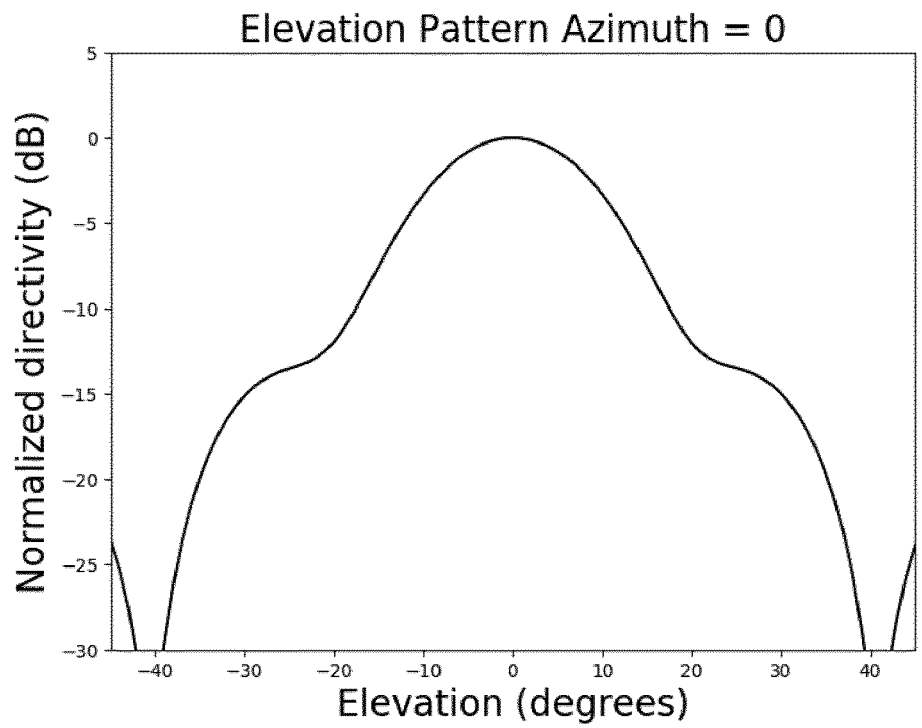
Figure 5B:
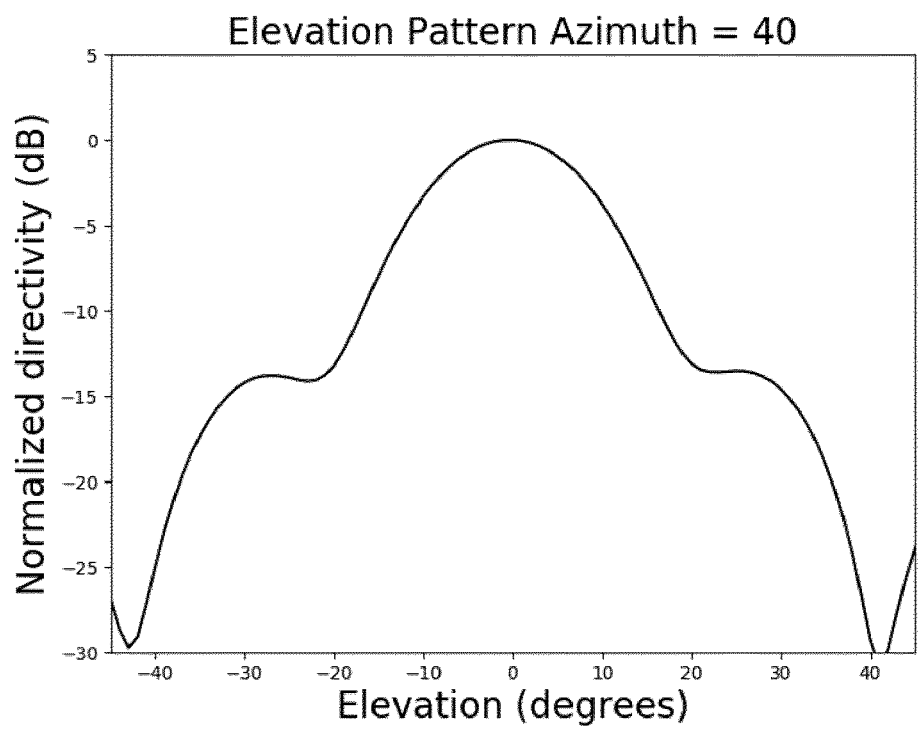
Figure 5C:
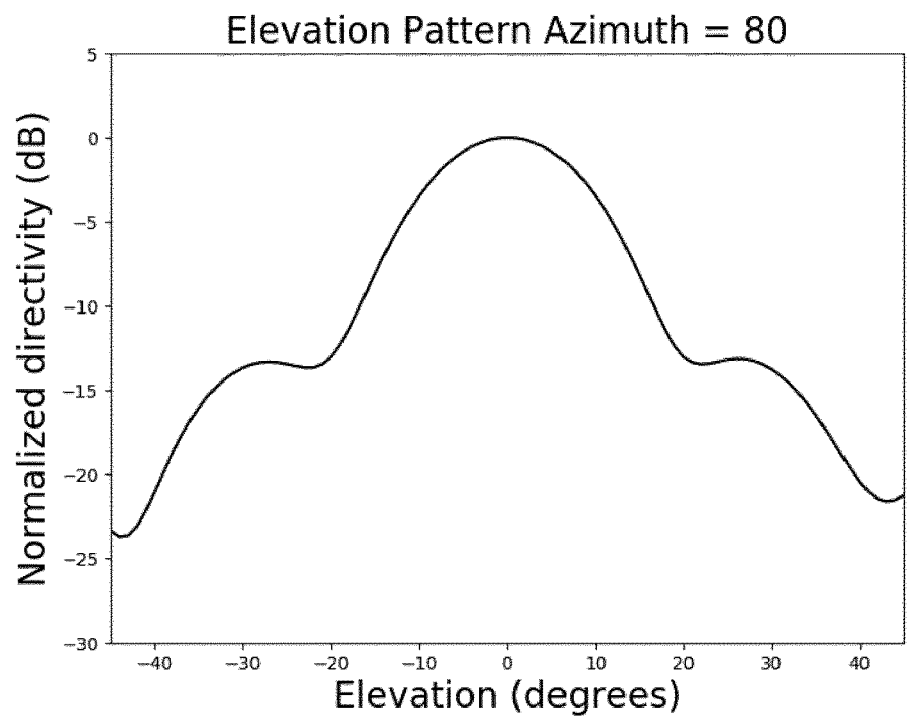
Figure 5D:
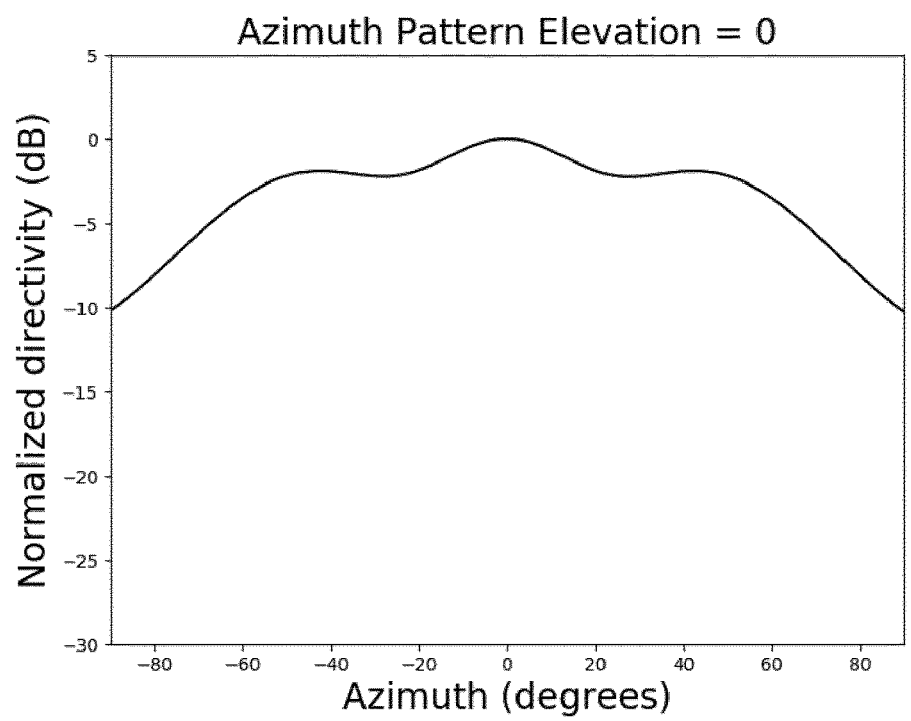
Figure 5E:
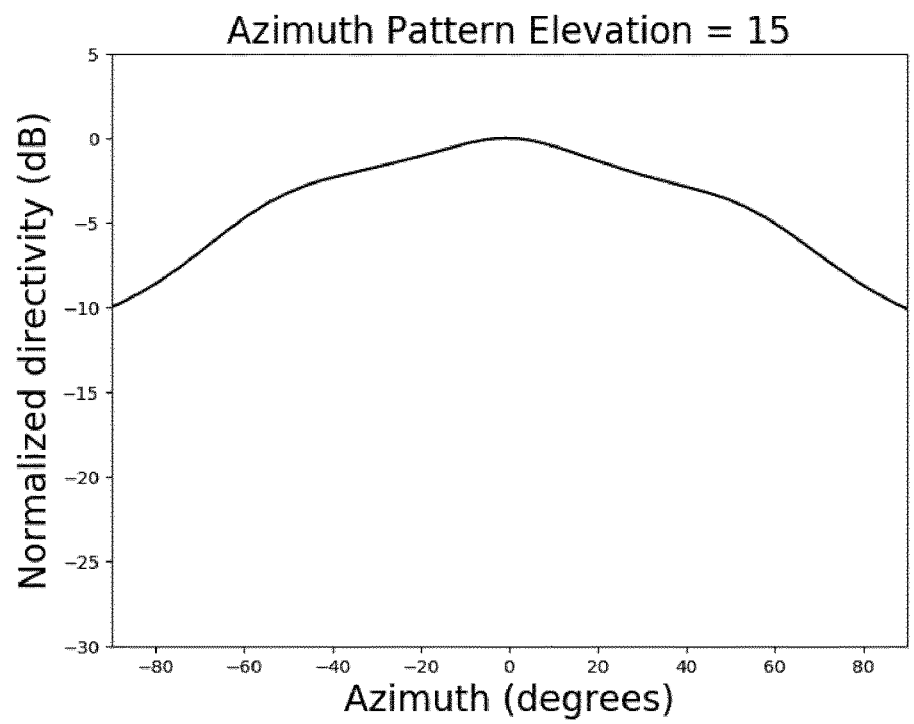
Figure 5F:
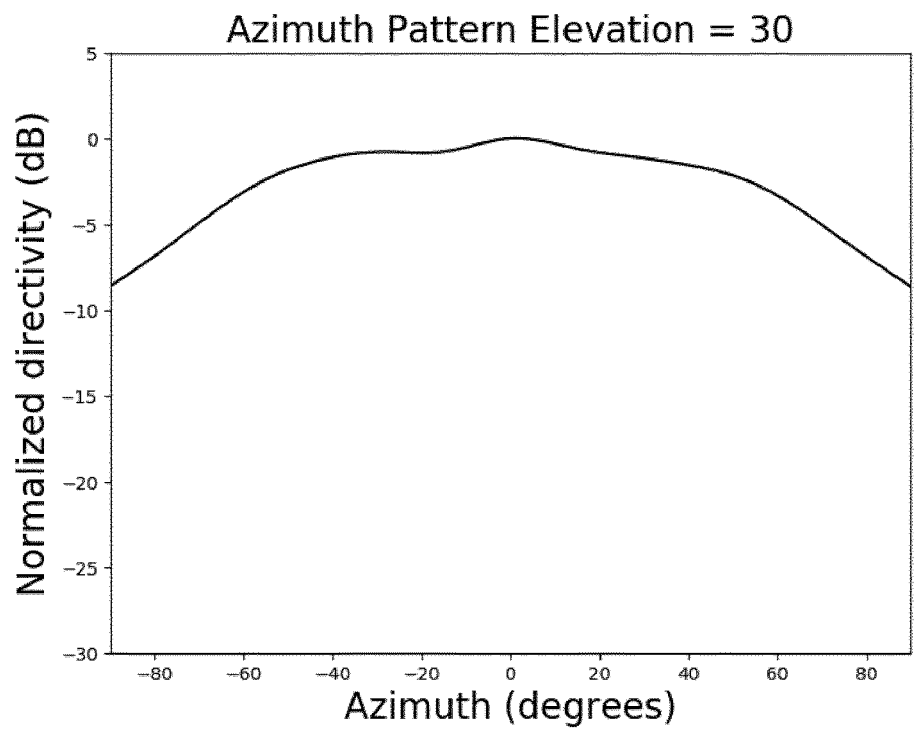

FIGS. 4A-F show a normalized directivity for different cuts of the radiation pattern of the antenna arrangement of FIG. 2. FIGS. 4A-C show the elevation dimension pattern for the azimuth angles 0, 40, and 80 degrees, respectively. The elevation dimension coincides with the extension direction of the slots. FIGS. 4D-F show the azimuth dimension pattern for the elevation angles 0, 15, and 30 degrees. FIGS. 5A-F show the same radiation pattern cuts of the antenna arrangement of FIG. 3. The disclosed antenna arrangement 100 presents a much-improved radiation pattern over the antenna arrangement from FIG. 3. The disclosed antenna arrangement 100 presents much lower SSL in the elevation dimension, especially for large values of the azimuth angle. The radiation pattern in the elevation dimension of the disclosed antenna arrangement is also more symmetrical around the elevation angle zero, which is an advantage. Furthermore, disclosed antenna arrangement 100 presents more symmetrical radiation pattern in the azimuth dimension, especially for large values of the elevation angle. It can also be seen that the disclosed antenna arrangement 100 presents a more uniform radiation pattern in the azimuth dimension (in contrast to a directive pattern), which is an advantage.

Figure 6A:
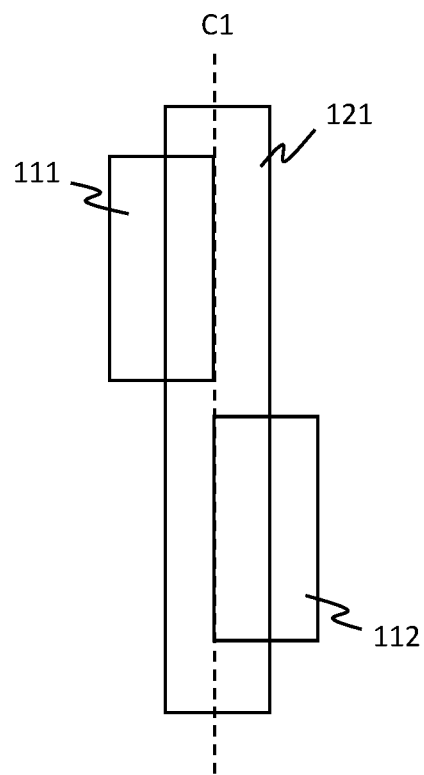
Figure 6B:
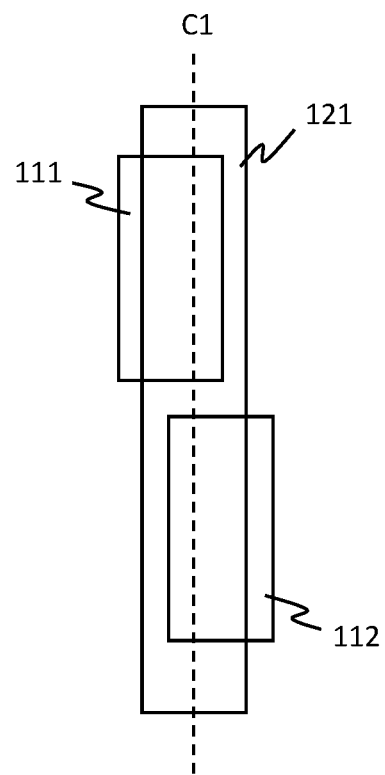

FIGS. 6A and 6B show details of the ridge 121 and the slots 111, 112 of example antenna arrangements. Every other slot is displaced to opposite sides relative a centerline C1 of the ridge. In FIG. 6A, the slots are displaced such that the centers of the slots face the edges of the ridge, whereas the slots in FIG. 6B are displaced less, i.e. such that the centers of the slots are closer to the centerline C1.

FIGS. 7A-D show details of the ridge 121 and the slots 111, 112 according to examples of the present disclosure.

Figure 7A:
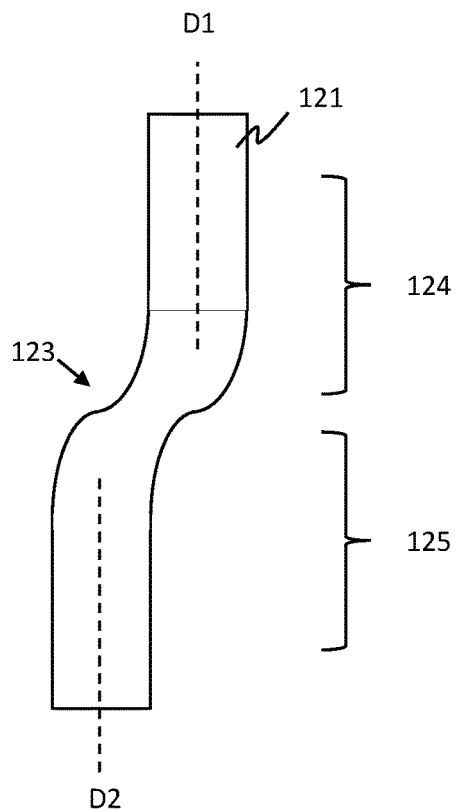
FIG. 7A-D show example ridge and slot configurations.

FIG. 7A shows that the ridge 121 comprises a first section 124 connected to a second section 125 via a curved section 123. The first section 124 extends along a first ridge axis D1 and the second section 125 extends along a second ridge axis D2, which is different from the first ridge axis D1. The curved section 123 may be configured to arrange the first ridge axis D1 between 0 degrees and 45 degrees relative to the second ridge axis D2, but other values are also possible. Preferably, the first D1 and second D2 ridge axes are parallel.

In FIGS. 3 and 7A-D, the ridge is shown as a rectangular protrusion from a planar substrate 127, with a width and height (normal to the substrate 127) substantially shorter than the length. Other shapes are, of course, possible, such as having rounded corners. The dimensions of the ridge are not necessarily uniform along the length of the ridge. Furthermore, a ridge axis is still present even if the ridge is somewhat wavy or not rotationally symmetric about one of the ride axes.

Figure 9:
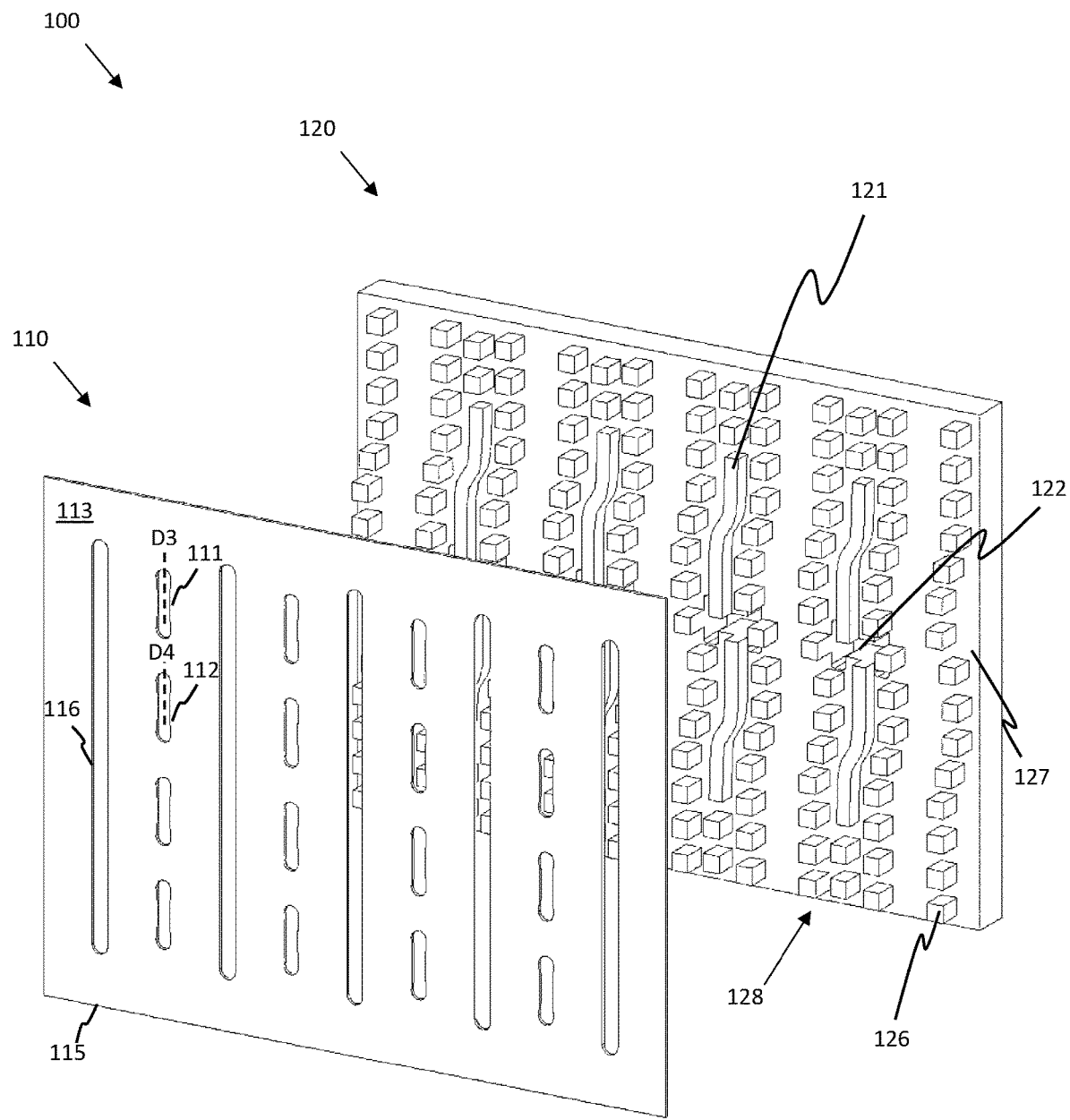
FIG. 9 shows an exploded view of an example antenna arrangement.

The ridge may comprise a first straight section 124 connected to a second straight section 125. Other shapes of the sections 124, 125 are also possible, such as curved shapes. The ridge in FIG. 7A comprises two sections. However, the ridge 121 may comprise three or more sections. In that case, the radiation layer may comprise a respective slot facing each section. Furthermore, every other section of the ridge 121 may extend along the same axis. The distribution layer may also comprise a plurality of ridges, as is shown in FIGS. 3 and 9.

According to aspects, a waveguiding path of the first ridge waveguide is arranged to match the shape of the first ridge. Having the waveguiding path match the shapes of the ridge provides a more constant characteristic of the waveguide along the path compared to a straight waveguide. This provides substantially better electromagnetic coupling from the waveguides to the respective slots. This, in turn, enables a better control of the radiation pattern, e.g., to reduce ripple further.

The ridge waveguide may be ridge gap waveguide comprising protruding elements as side walls, which is discussed in more detail below. The ridge waveguides can be other types of ridge waveguides as well, such as a rectangular waveguide with a ridge. The side walls of the waveguiding path (i.e., the path which the electromagnetic wave is guided) can be comprised of a conductive wall, as in a rectangular waveguide, or an electromagnetic bandgap, EBG, structure, like the protrusions in FIGS. 3, 9, 12, 15, 17, and 18. The side walls are the structures confining the wave along the surface of the distribution layer.

In FIG. 3, the ridges are arranged mostly in the center of the respective waveguiding paths. In other words, the side walls extend along the same or in a similar direction as the extension direction (or tangent) of a section of the ridge. Preferably, the distances between the ridge and the side wall on respective sides of ridge are equal, i.e., at a particular point along the ridge, the distance from the ridge to the side wall on one side is equal to the distance from the ridge to the side wall on the other side. This provides a symmetry to the ridge waveguide. To summarize, according to aspects, a distance from a side wall to the ridge in one of the ridge waveguides, measured in a cross section the waveguide, varies less than 30 percent, preferably less than 20 percent, and more preferably less than 10 percent, along the first ridge waveguide. Measuring the distance in a cross section the waveguide can be described as the having the distance between the sidewall and the ridge measured along the surface of the distribution layer 120 and substantially perpendicular to a tangent of the ridge.

FIG. 3 shows an example where the distribution layer feed 122 is arranged in between two ridges. More specifically, the layer feed 122 is a thru hole to the other side of the distribution layer. The shape of the thru hole and the shape of a part of the ridge adjacent to the thru hole can be adapted to optimize the electromagnetic coupling from the distribution layer feed to the ridge, i.e. to optimize matching. Other types of feeds are also possible, such as a coaxial to waveguide transition.

Figure 12:
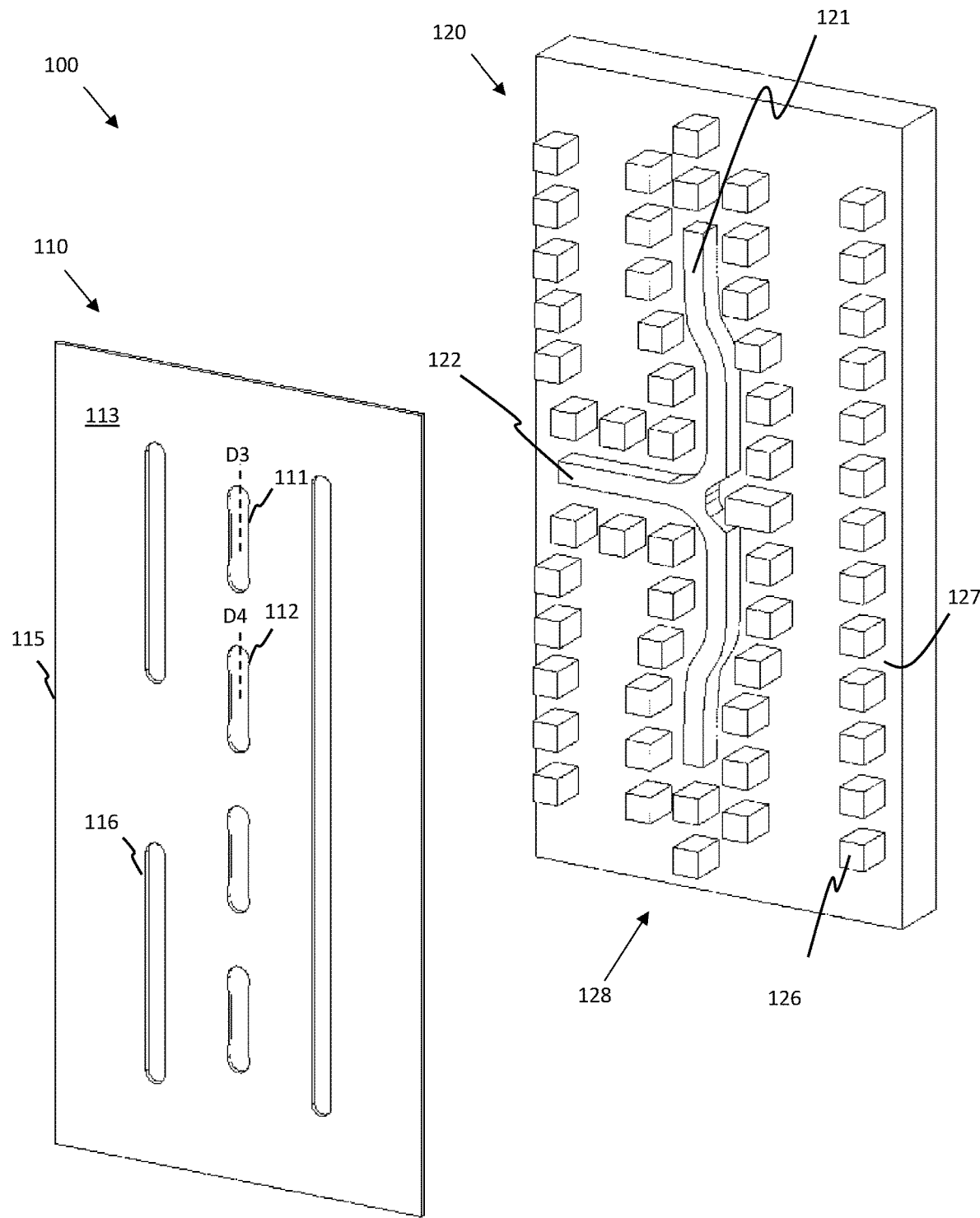
FIG. 12 shows an exploded view of an example antenna arrangement.
Figure 17:
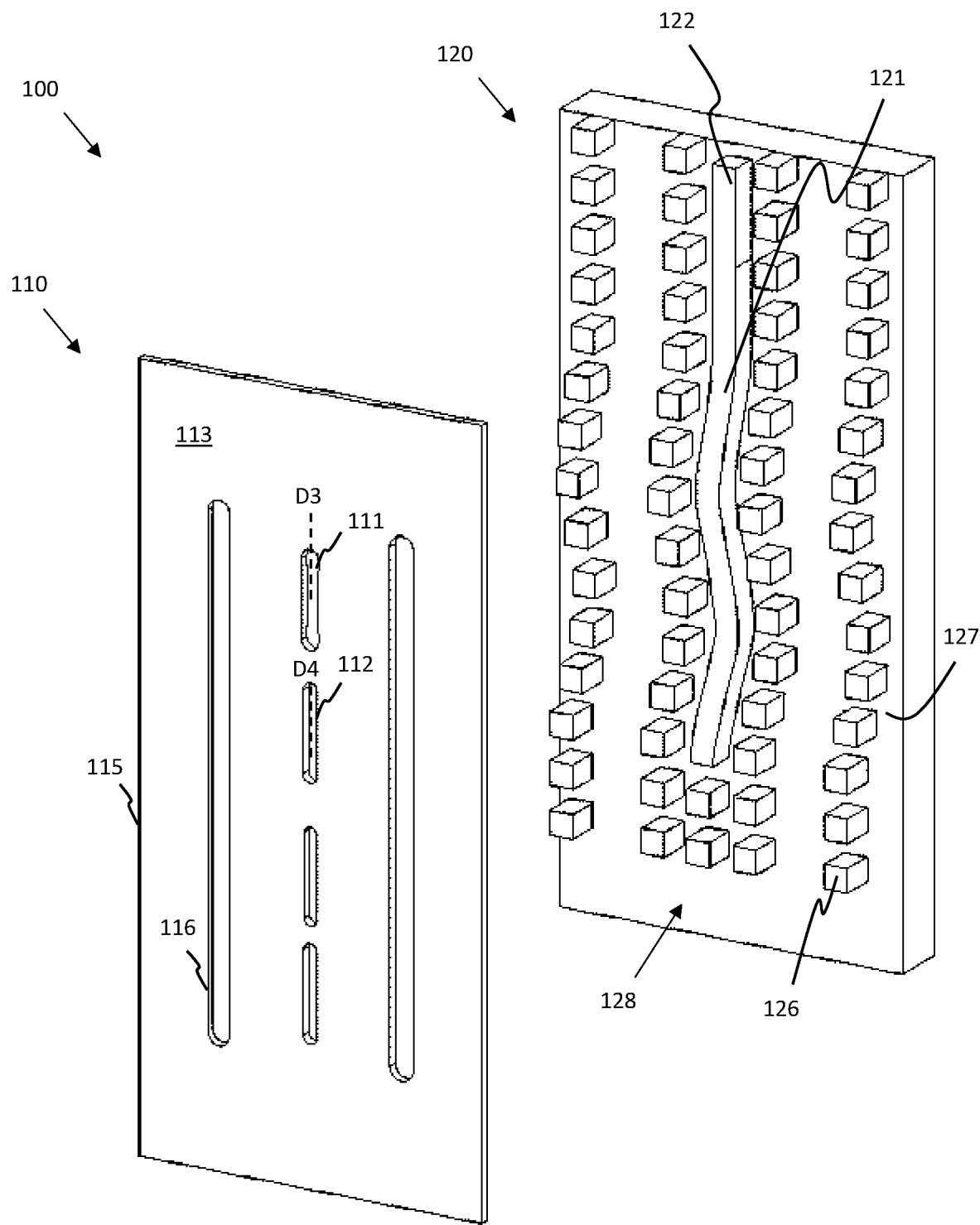
FIG. 17 shows an exploded view of an example antenna arrangement.
Figure 18:
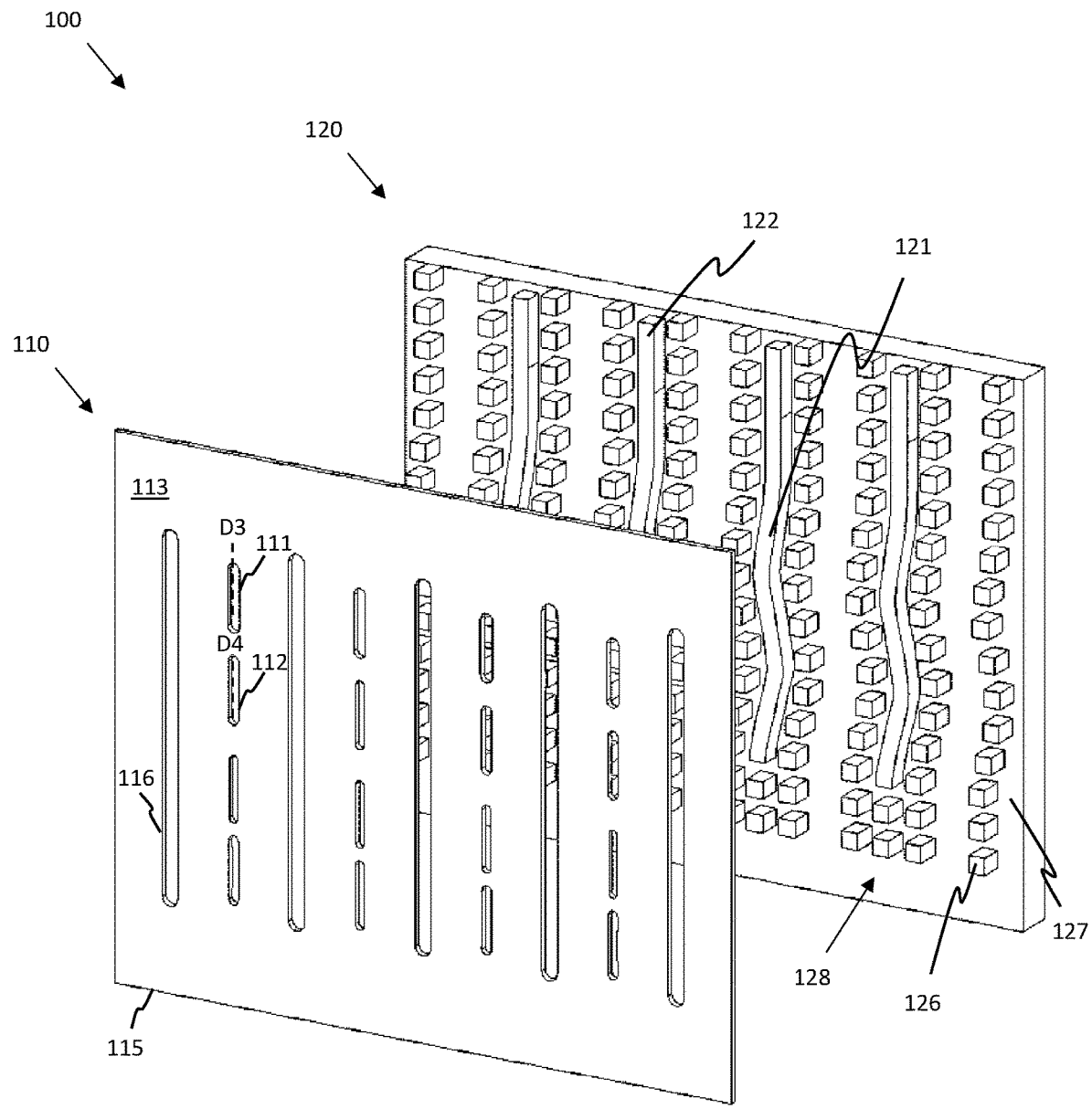
FIG. 18 shows an exploded view of an example antenna arrangement.

The distribution layer feed may be arranged to connect one or more ridges 121 via a distribution layer feed ridge arranged along the distribution layer, as is shown in FIGS. 12, 17, and 18.

According to aspects, the distribution layer 120 comprise a first and a second ridge, where the distribution layer feed 122 is arranged in between the first and second ridges, wherein a connection section of the first ridge is arranged offset from a center line of the distribution layer feed, and a connection section of the second ridge is arranged offset from the center line of the distribution layer feed, wherein the connection sections are arranged to guide electromagnetic waves form the distribution layer feed 122 to the respective ridges. The centerline may extend in the extension direction of a column comprising the slots facing the two ridges. This may facilitate offsetting the first and second slots in different directions without changing the distance between slots or without changing the width of the ridge.

Figure 7B:
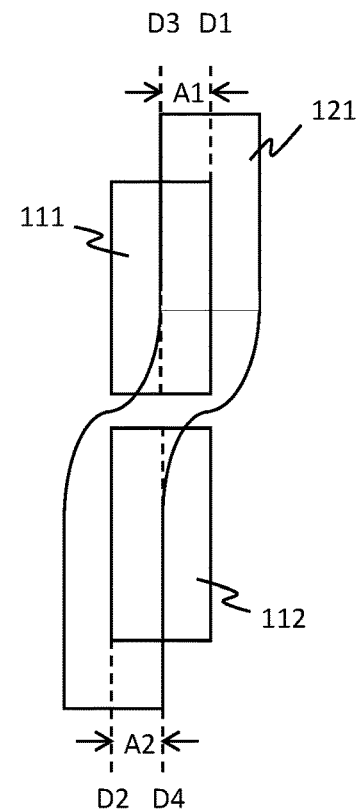
Figure 7C:
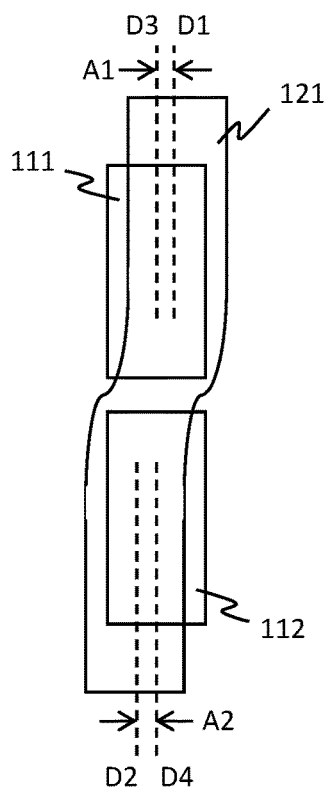
Figure 7D:
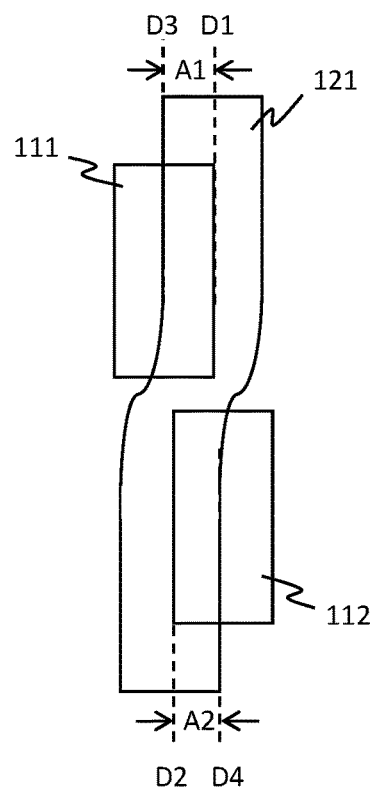

FIGS. 7B, 7C, and 7D show that the first slot 111 is arranged facing the first section 124 of the ridge with the first slot axis D3 arranged offset A1 from the first ridge axis D1 in a direction towards the second ridge axis D2. The second slot 112 is arranged facing the second section 125 with the second slot axis D4 arranged offset A2 from the second ridge axis D2 in a direction towards the first ridge axis D1. Preferably, but not necessarily, the first and second slot axes D3, D4 are parallel. Even more preferably, the first and second slots have the same slot axis D3, D4, as is shown in FIGS. 7B and 7C. This, advantageously, provides a radiation pattern with low SSL. However, the embodiment of FIG. 7D also provide an improved radiation pattern over prior art. The centers of the slots may face the edges of the ridge, as is shown in FIG. 7B. Other arrangements are also possible, as is shown in FIG. 7C.

Figure 8:
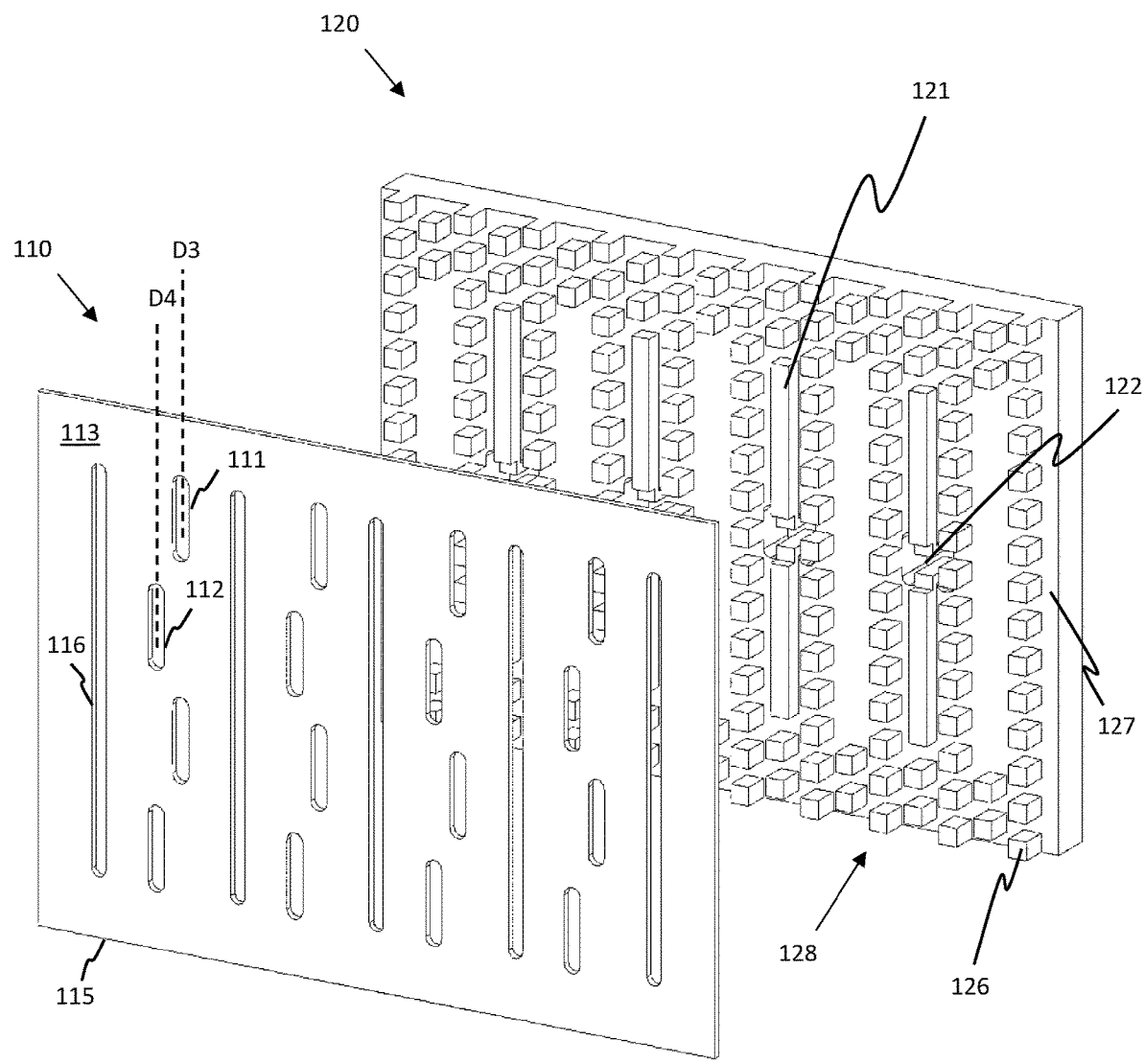
FIG. 8 shows an exploded view of an example antenna arrangement.

FIGS. 8 and 9 show example 4×4 slot antenna arrangements. These antenna arrangements comprise four columns with four slots, respectively, extending in a single direction on the radiation layer. In these two examples, one distribution layer feed is arranged in between two ridges for each column. Each of these ridges couples the electromagnetic signal to two slots, respectively. In FIG. 8, both ridges extend on a single axis. To avoid grating lobes, the slots must be arranged alternately displaced along the centerline of the ridges in a column. This way, every other slot faces opposite edges of the ridge in the column. In FIG. 9, on the other hand, the slots are arranged on a single axis per column and the ridges are arranged in a way that sections of the ridge are displaced such that every other slot in a column faces opposite edges of the ridge.

Figure 10A:
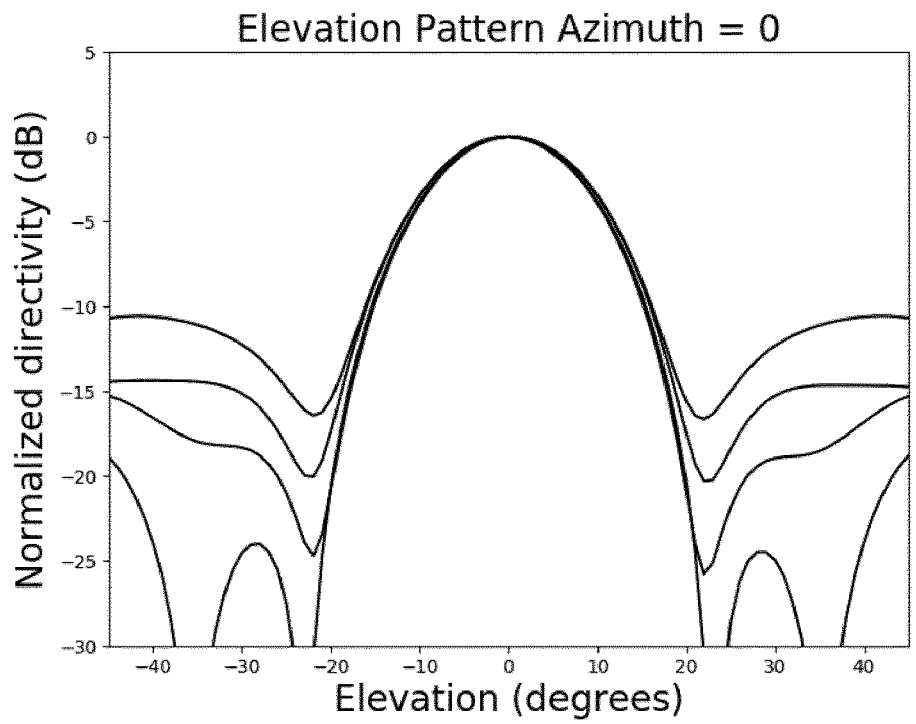
FIGS. 10A-F show different cuts of the radiation patterns of the example antenna arrangement of FIG. 8, FIGS. 11A-F show different cuts of the radiation patterns of the example antenna arrangement of FIG. 9.
Figure 10B:
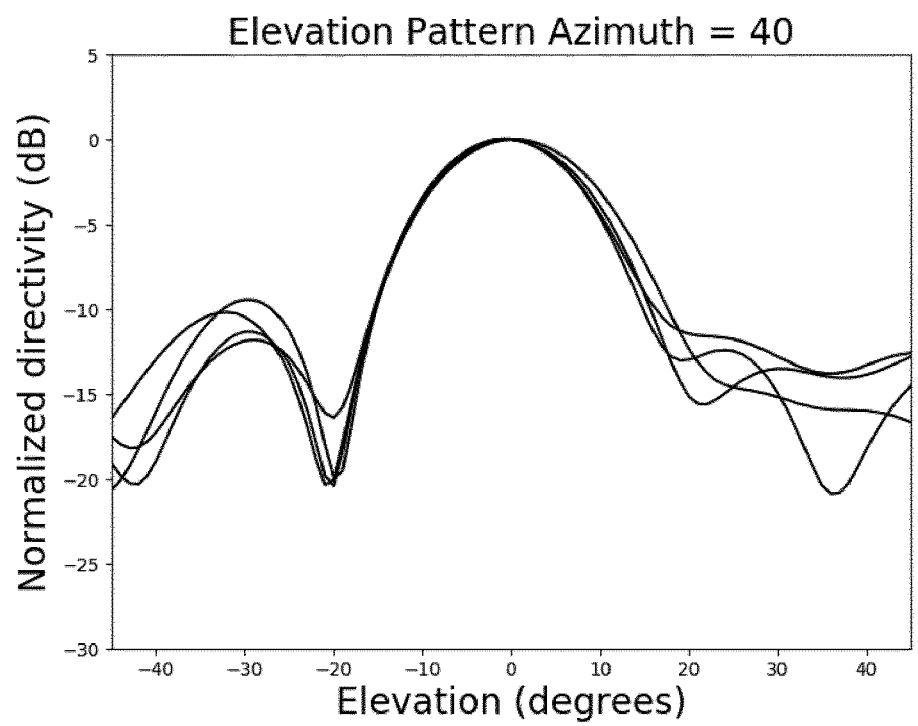
Figure 10C:
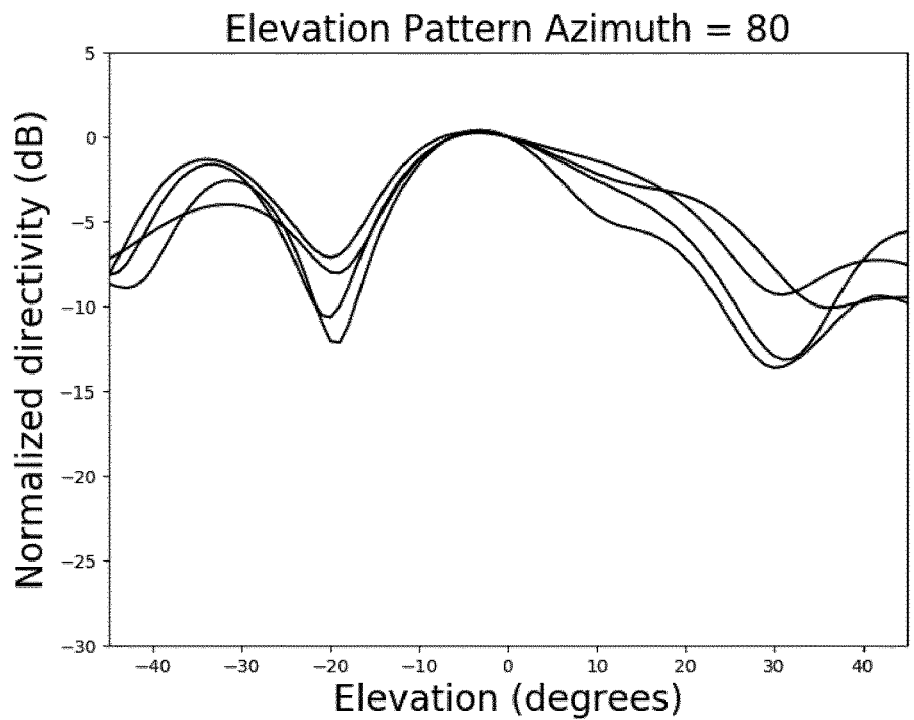
Figure 10D:
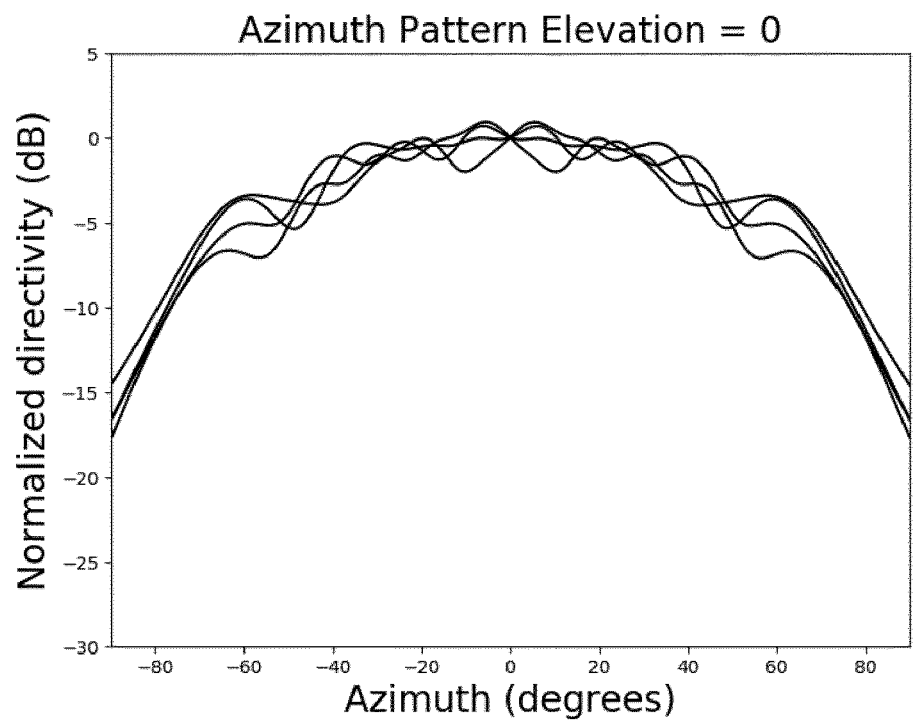
Figure 10E:
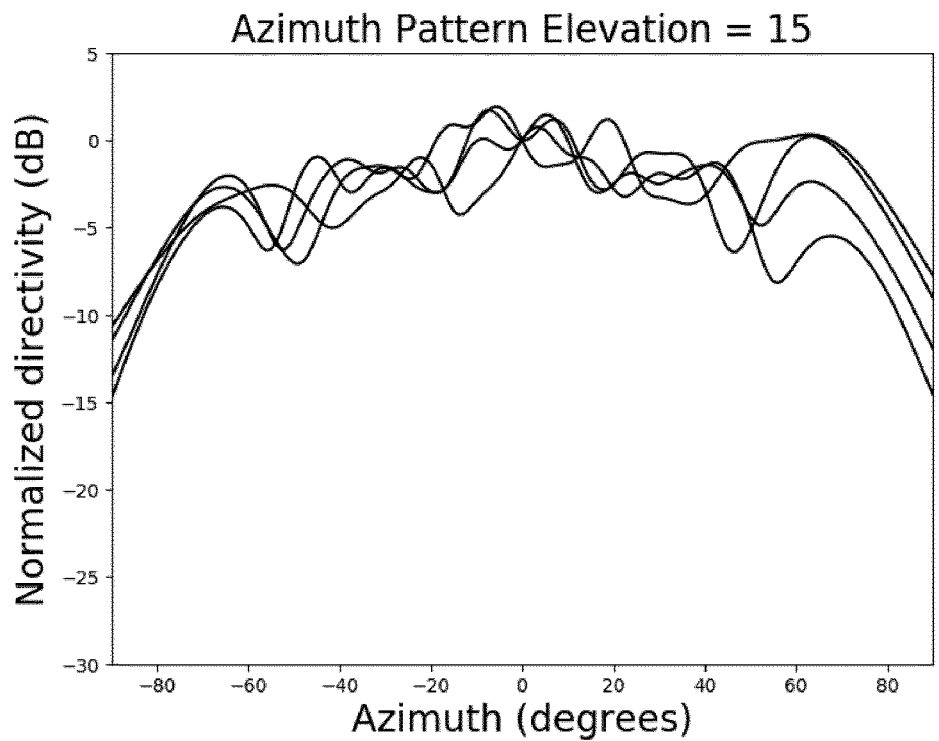
Figure 10F:
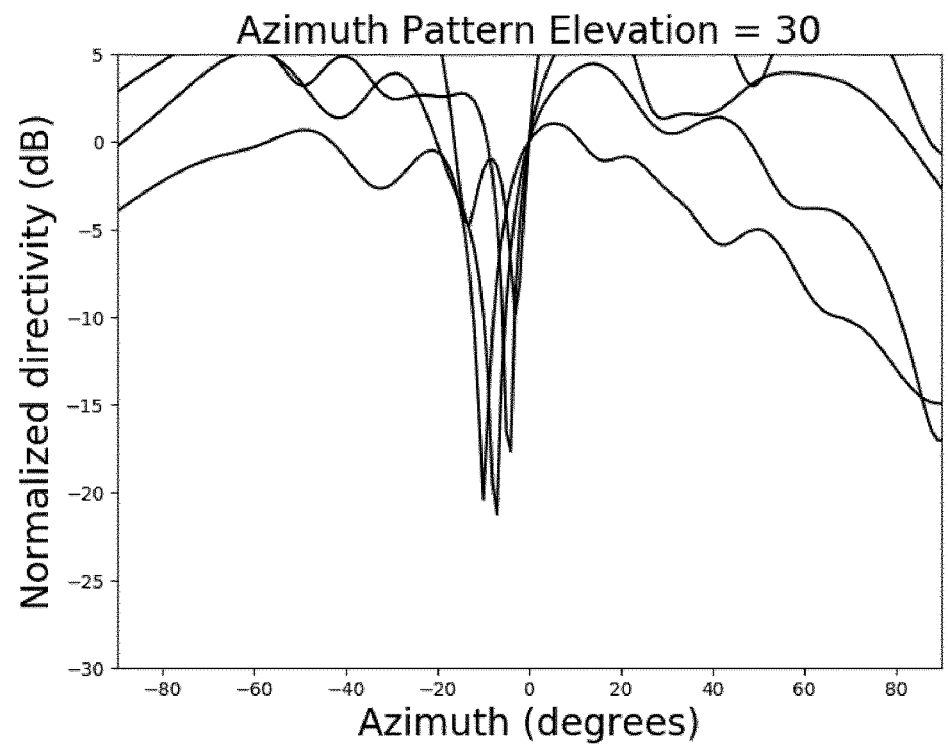
Figure 11A:
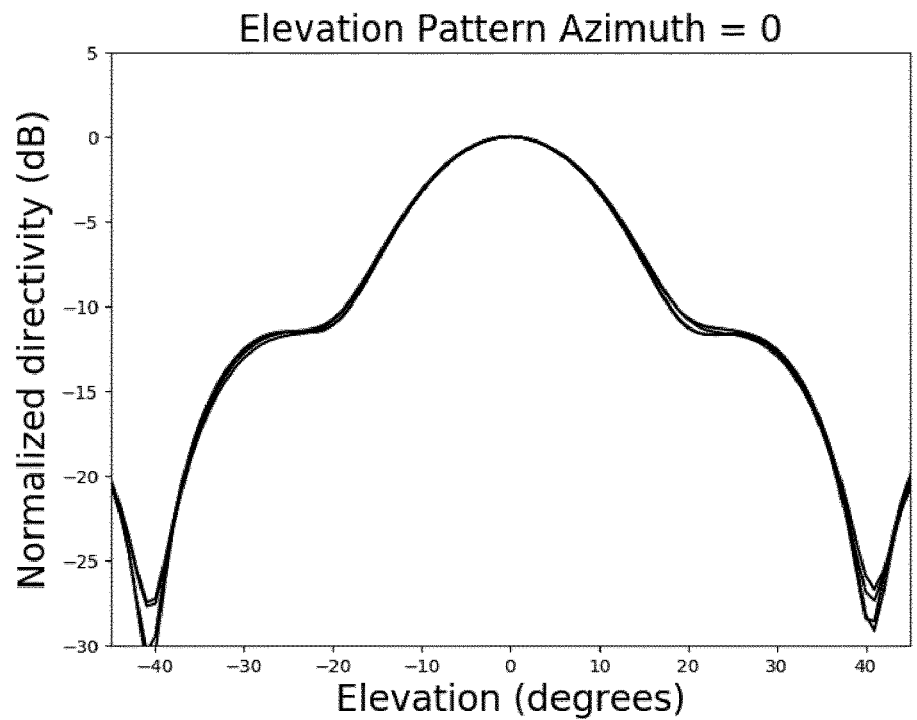
Figure 11B:
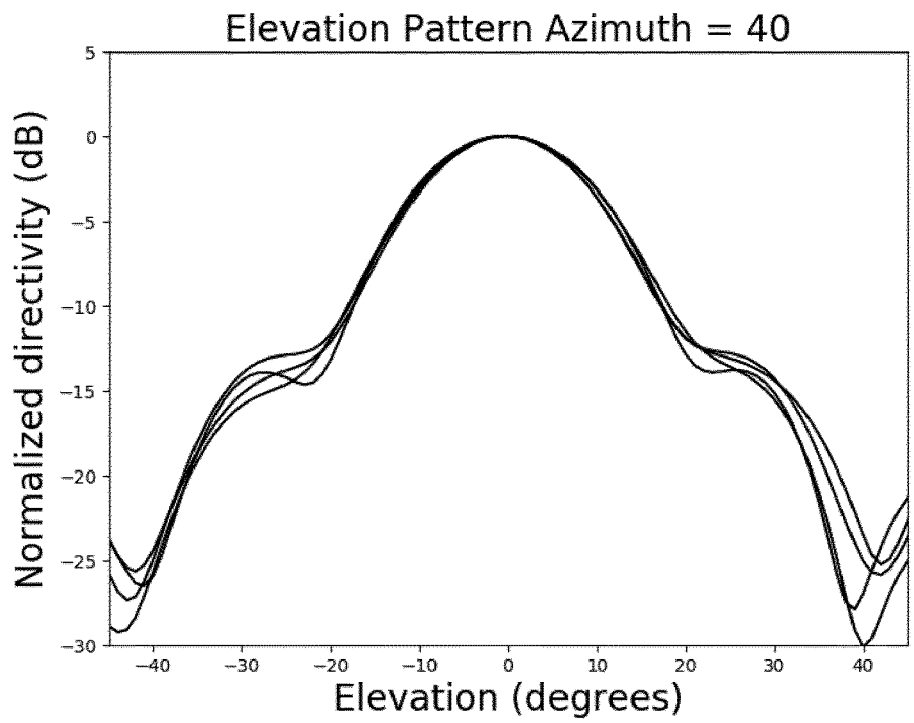
Figure 11C:
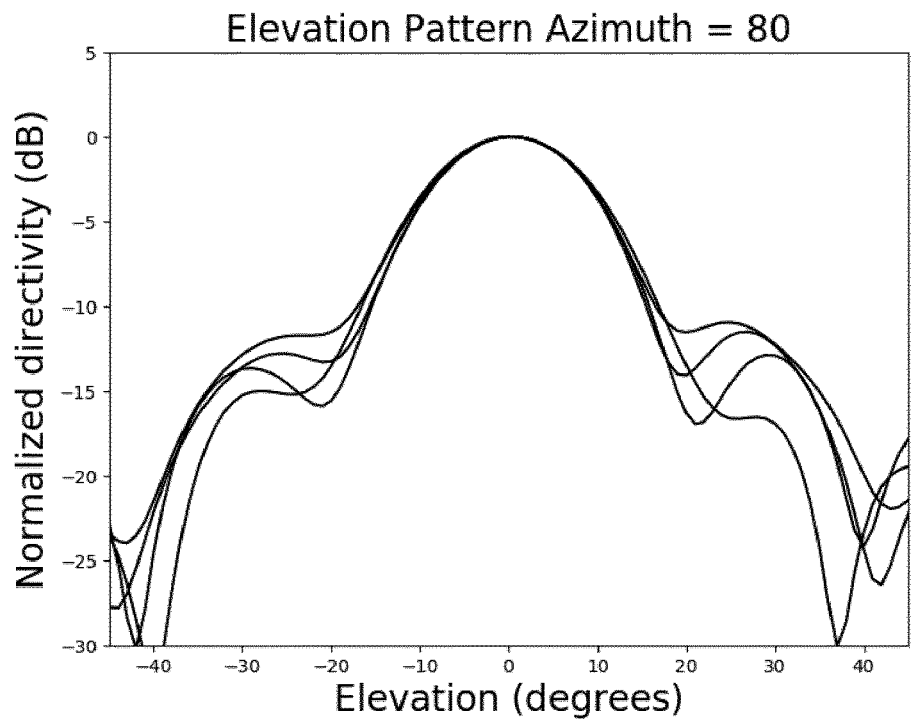
Figure 11D:
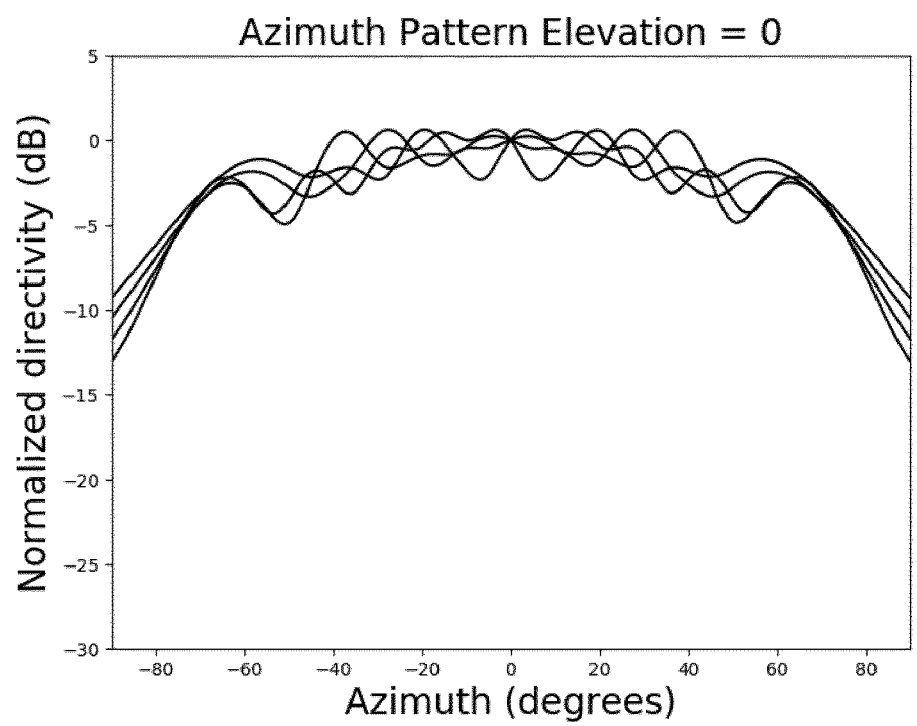
Figure 11E:
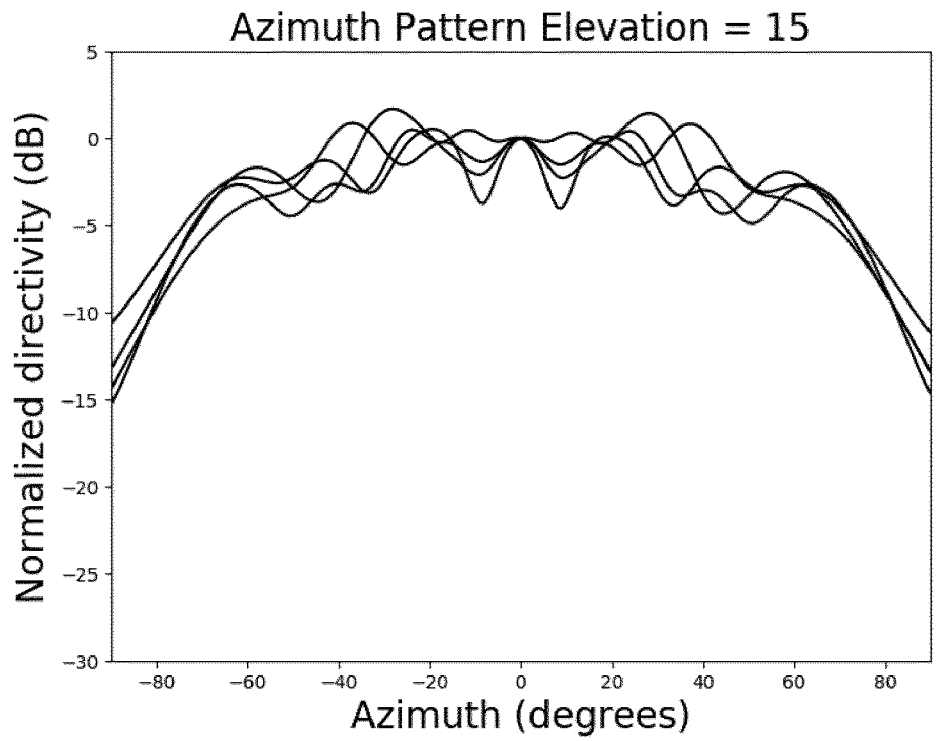
Figure 11F:
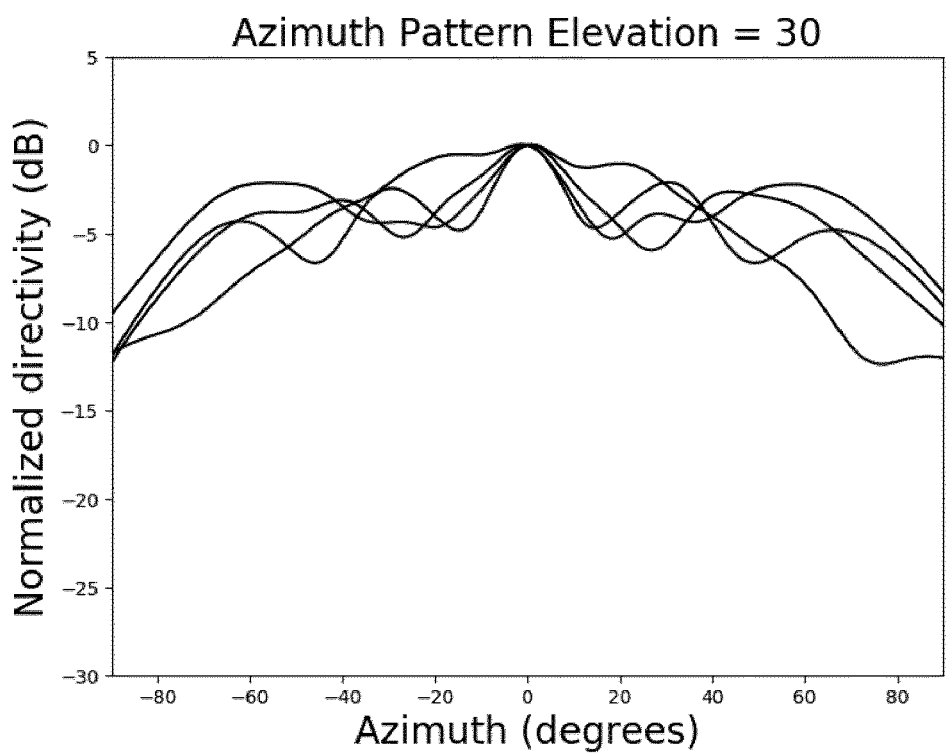

FIGS. 10A-F show a normalized directivity for different cuts of the radiation pattern for each column of the antenna arrangement of FIG. 8. FIGS. 10A-C show the elevation dimension pattern for the azimuth angles 0, 40, and 80 degrees, respectively. The elevation dimension coincides with the extension direction of the slots. FIGS. 10D-F show the azimuth dimension pattern for the elevation angles 0, 15, and 30 degrees. FIGS. 11A-F show the same radiation pattern cuts for each column of the antenna arrangement of FIG. 9. The disclosed antenna arrangement 100 presents a much-improved radiation pattern over the antenna arrangement from FIG. 8. The disclosed antenna arrangement 100 presents much lower SSL in the elevation dimension, especially for large values of the azimuth angle. The radiation pattern in the elevation dimension of the disclosed antenna arrangement is also more symmetrical around the elevation angle zero, which is an advantage. Furthermore, disclosed antenna arrangement 100 presents more symmetrical radiation pattern in the azimuth dimension, especially for large values of the elevation angle. It can also be seen that the disclosed antenna arrangement 100 presents a more uniform radiation pattern in the azimuth dimension (in contrast to a directive pattern), which is an advantage. In addition, the different columns of the disclosed antenna arrangement 100 present radiation patterns with less deviation relative to each other compared to prior art, which is an advantage. In other words, the radiation pattern of a column in the disclosed antenna arrangement 100 is barely affected by the column's position in the antenna arrangement 100, which is an advantage.

The antenna arrangement 100 may comprise one or more surface current suppressing members 116 arranged on the surface 113. The one or more surface current suppressing members are arranged to suppress a surface current from a slot 111, 112 to the surface boundary 115. This provides a radiation pattern with a main lobe that is wide with a low ripple in the azimuth dimension (the elevation dimension coincides with the extension direction of the slots). A ripple in the main lobe is a variation of the radiation power versus the angle (in e.g. the azimuth dimension) within the main lobe. If the amplitude of the ripple is larger than half of the maximum radiated power, the radiation pattern will no longer comprise a single main lobe. The ripple may be periodic or aperiodic versus the angle.

Figure 13:
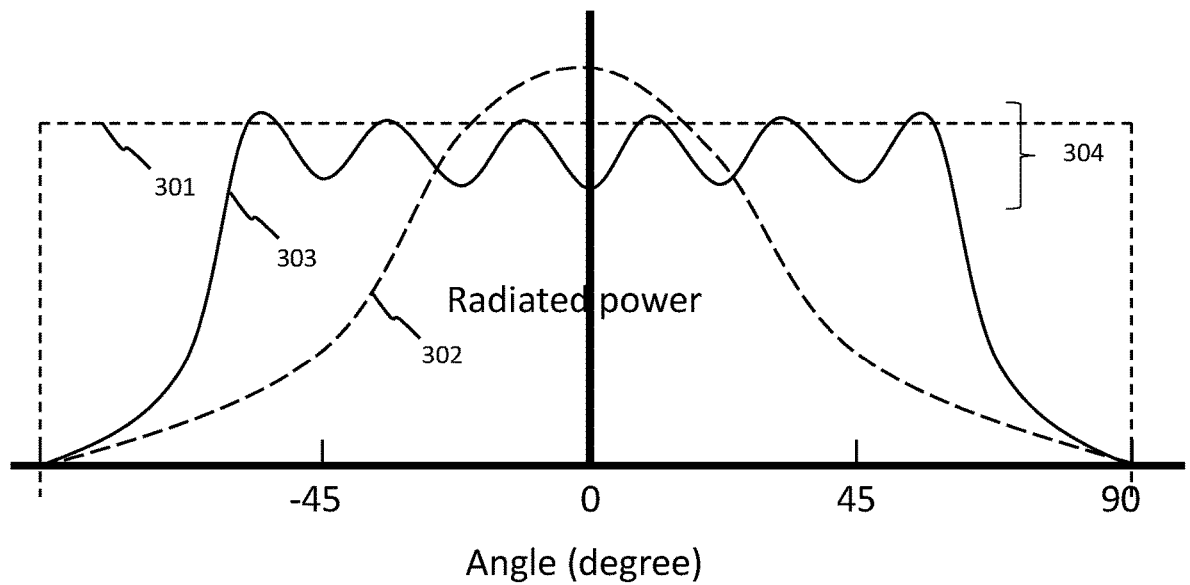
FIG. 13 illustrates example radiation patterns.

The electrically conductive surface 113 of the radiation layer 110 acts as a ground plane. The surface comprises a good electrical conductor, e.g. copper. FIG. 13 shows radiation patterns in the azimuth dimension for different single slot antenna arrangements, wherein the slots are oriented such that they are elongated vertically. An ideal slot antenna with an infinite ground plane presents a perfectly uniform radiation pattern 301 over span of 180 degrees in the azimuth dimension. However, due to a finite ground plane, a real conventional slot antenna presents a ripple 304 in the radiation pattern 303 in the azimuth dimension. This ripple may be reduced at the cost of making the beam narrower, as in 302. The finite ground plane results in surface currents being scattered at ground plane edges and/or at any neighboring slots. Here, the surface currents arise from the slot apertures. In other words, discontinuities in the ground plane give rise to the scattering. If the ground-plane were infinitely large, there would be no scattered surface currents arising from the ground plane edges. The scattered surface currents cause unwanted radiation from the antenna arrangement, which disrupts the radiation pattern arising from the slot aperture.

The surface current suppressing members suppress the surface currents and therefore reduce the unwanted radiation. Consequently, the surface current suppressing members improve the radiation pattern of the antenna arrangement in terms of lowering the ripple while maintaining a wide main lobe. The radiation pattern of the disclosed antenna arrangement comprising current suppressing members is therefore more uniform and resembles the flat radiation pattern 301 in FIG. 13.

The surface 113 of the radiating layer 110 is electrically conductive. However, it is appreciated that a plastic film, or such, may cover the radiating layer. Thus, an outer surface of the antenna arrangement 100 is not necessarily electrically conductive. Thus, in an example embodiment, the radiating layer comprises a metalized plastic. Then, either or both faces of the plastic layer can be metalized, i.e. a metallization can constitute the surface 113.

The surface 113 is not necessarily a planar surface. It is appreciated that other surface shapes are possible, such as surfaces having an arcuate form in one or two dimensions, as in, e.g., conformal antennas. The surface may have an arcuate form.

Figure 14A:
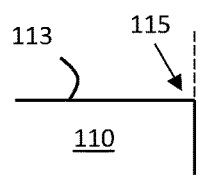
FIGS. 14A-B show side views of example antenna arrangements.
Figure 14B:
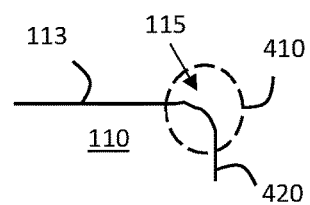

The one or more surface current suppressing members 116 may be arranged in connection to the surface boundary 115. FIGS. 14A and 14B show details of example surface boundaries 115. In FIG. 14A, the surface boundary comprises a 90-degree corner. As such, the surface current suppressing members is arranged in connection to the corner. In FIG. 14B, the surface boundary comprises a rounded corner. As such, the surface current suppressing members is arranged in the vicinity 410 of the corner. It is appreciated that other shapes of the surface boundary are possible. It is also appreciated that the surface current suppressing member may extend over the surface boundary, thereby the surface current suppressing member may partly be arranged on the surface 113 and partly on an adjacent surface 420. The adjacent surface may be arranged, for example, 90 degrees relative to the surface 113, although other angles are also possible.

In an example embodiment of the antenna arrangement 100, the one or more surface current suppressing members 116 are arranged in connection to the surface boundary 115 and surround the slots 111, 112. Here, to surround means to form a perimeter around the surrounded object. It is, however, appreciated that small gaps can be formed in the perimeter without loss of function. In this type of configuration, the surface current suppressing members may improve the radiation pattern in the azimuth dimension for any orientation of the slots on the surface 113, which is an advantage.

In an example embodiment of the antenna arrangement, at least one of the one or more surface current suppressing members 116 is arranged between slots. Arranged between here means to be located on a straight line drawn between two adjacent slots, see, e.g., FIG. 9.

In an example embodiment of the antenna arrangement 100, at least one of the slots is surrounded by the one or more surface current suppressing members.

In the disclosed antenna arrangement 100, the one or more surface current suppressing members 116 may comprise one or more electromagnetic absorbers. The electromagnetic absorbers suppress surface currents by attenuation. An electromagnetic absorber generally comprises lossy materials that attenuate transmission or reflection of electromagnetic radiation. As such, an electromagnetic absorber should be neither a good electrical isolator (as in, e.g., rubber) nor a good electrical conductor (as in, e.g., copper). An example of an electromagnetic absorber is a foam material loaded with iron and/or carbon. Electromagnetic absorbers can be resonant, i.e. a particular frequency is attenuated (e.g. 30 GHz), or broadband, i.e. a span of frequencies is attenuated (e.g. 1 GHz to 40 GHz). The attenuation of electromagnetic radiation in a direction is dependent on the thickness of the electromagnetic absorber in the same direction. One example of attenuation per length is 10 dB/cm at 2 GHz. Another example is 150 dB/cm at 30 GHz. These two examples of attenuation per length could be applicable to the disclosed antenna arrangement 100.

The one or more electromagnetic absorbers may be arranged on top of the surface 113. At least one of the one or more electromagnetic absorbers may be coated onto the surface 113 for a quick and cost-effective manufacturing process. The coating may comprise spraying an electromagnetic absorbing material onto the surface 113. Furthermore, the one or more electromagnetic absorbers may be attached to the surface 113 by an adhesive.

At least one of the one or more electromagnetic absorbers may be arranged in a recess formed in the surface 113. Thereby, it is possible to arrange the one or more electromagnetic absorbers flush with the surface 113. Such arrangement may save space, facilitate assembly, and may be used to avoid snagging of the electromagnetic absorbers during, e.g., antenna assembly.

The surface 113 may comprise a metalized coating on a support layer, and the one or more electromagnetic absorbers may then constitute part of the support layer. The radiating layer thus comprises the support layer and the metallization. On the support layer, the side opposite of the surface 113 may also be metalized. Preferably, the insides of the slots are also metalized. In other words, the antenna arrangement may comprise a support layer with slot cutouts, wherein every surface except predetermined areas are metalized. The predetermined areas then constitute the electromagnetic absorbers. The predetermined areas could for example be covered with a removable film when the support layer is metalized.

In an example embodiment of the disclosed antenna arrangement, the support layer comprises a plastic, wherein the plastic has electromagnetic absorbing properties at the frequency band of operation of the antenna arrangement.

Metallization of plastics can be done in two steps, wherein a primer is first applied onto a plastic surface before the plastic surface is coated with a desirable metal. In the present disclosure, desirable metals for the metallization of plastics have low loss and high electrical conductivity, e.g. copper, silver, and gold. Many other metals and alloys are also possible. Examples of suitable primers are nickel, chromium, palladium, and titanium, although many other materials are also possible. Therefore, in another example embodiment of the disclosed antenna arrangement, areas coated only with the primer comprise the electromagnetic absorbers, i.e. the support layer comprises a primer. In other words, the antenna arrangement may comprise a plastic layer with slot cutouts, wherein every surface is coated with a primer. Thereafter, every area except predetermined areas are metalized. The predetermined areas constitute the electromagnetic absorbers.

The one or more surface current suppressing members 116 may comprise one or more grooves. The grooves suppress surface currents by scattering the surface currents in a controlled fashion. A surface current that interacts with the groove is scattered as electromagnetic radiation, whereby its energy decreases and the current is suppressed. Surface currents, arising from the one or more slots, that are scattered at the surface boundary 115 and/or at any neighboring slots degrade the radiation pattern of the antenna arrangement 100. By scattering the surface current in a controlled fashion, the desired radiation pattern can be maintained. The insides of the grooves are preferably electrically conductive.

The slots 111, 112 are cutouts penetrating through the surface 113 and provides passages, whereas the grooves are recesses that do not provide passages. The grooves may be shallower than the slots or the slots may be more or equally shallow compared to the grooves.

The one or more grooves may comprise two layers. More specifically, the grooves can penetrate through the radiating layer 110 and extend into the distribution layer 120. The continuation of the groove in the distribution layer 120 does not necessarily size match the part of the groove opening in the radiating layer. For example, the continuation may be wider. The purpose of the connected part of the distribution layer 120 is to seal the grooves shut.

FIG. 9 shows example surface current suppressing members 116 comprising grooves penetrating through the radiating layer 110 and extending into the distribution layer 120. Here, the extensions into the distribution layer are surrounded by electrically conductive protrusions 126 constituting an EBG structure. EBG structures are discussed in more detail below. The EBG structures prevent electromagnetic coupling along the surface of the EBG structure. Thereby, the EBG structures surrounding the extended grooves effectively seal the grooves shut. In FIG. 3, it can be noted that protrusions are not present at each end (310) of the grooves. This is possible since there are not any electrical fields at those locations that need to be contained functionality wise. However, protrusions may optionally be placed in those locations for other purposes, e.g. mechanical and shielding.

The ridge waveguide may be a ridge gap waveguide, which present compact designs, low loss, low leakage, and forgiving manufacturing and assembling tolerances. In this case, the distribution layer 120 comprises a first electromagnetic bandgap, EBG, structure 128. The ridge and the first EBG structure are arranged to form at least one first ridge gap waveguide intermediate the distribution layer 120 and the radiation layer 110. The first EBG structure is also arranged to prevent electromagnetic waves (i.e., electromagnetic propagation) in a frequency band of operation from propagating from the at least one first ridge gap waveguide in directions other than through the at least one distribution layer feed 122 and the at least two slots 111, 112. The distribution layer 120 is arranged with direct contact to the radiation layer 110 or is arranged at a distance from the radiation layer 110, where the distance is smaller than a quarter of a wavelength of center frequency of operation of the antenna arrangement 100.

The at least one waveguide couples the electromagnetic signal in the band of operation to one or more distribution layer feeds and/or to one or more slots. EBG structures prevent propagation by attenuation. Herein, to attenuate is interpreted as to significantly reduce an amplitude or power of electromagnetic radiation, such as a radio frequency signal. The attenuation is preferably complete, in which case attenuate and block are equivalent, but it is appreciated that such complete attenuation is not always possible to achieve.

The EBG structure is a type of metamaterial structure. The EBG structure surface may for example comprise repetitive electrically conductive pins, i.e. protruding elements 126, or repetitive electrically conductive cavities. There exists, however, a multitude of EBG structures. The EBG elements of the EBG structure are arranged in a periodic or quasi-periodic pattern in one, two or three dimensions. Herein, a quasi-periodic pattern is interpreted to mean a pattern that is locally periodic but displays no long-range order. A quasi-periodic pattern may be realized in one, two or three dimensions. As an example, a quasi-periodic pattern can be periodic at length scales below ten times an EBG element spacing, but not at length scales over 100 times the EBG element spacing.

An EBG structure may comprise at least two EBG element types, the first type of EBG element comprising an electrically conductive material and the second type of EBG element comprising an electrically insulating material. EBG elements of the first type may be made from a metal such as copper or aluminum, or from a non-conductive material like PTFE or FR-4 coated with a thin layer of an electrically conductive material like gold or copper. EBG elements of the first type may also be made from a material with an electric conductivity comparable to that of a metal, such as a carbon nanostructure or electrically conductive polymer. As an example, the electric conductivity of EBG elements of the first type can be above $10^3$ Siemens per meter (S/m). Preferably, the electric conductivity of EBG elements of the first type is above $10^5$ S/m. In other words, the electric conductivity of EBG elements of the first type is high enough that the electromagnetic radiation can induce currents in the EBG elements of the first type, and the electric conductivity of EBG elements of the second type is low enough that no currents can be induced in EBG elements of the second type. EBG elements of the second type may optionally be non-conductive polymers, vacuum, or air. Examples of such non-conductive EBG element types also comprise FR-4 PCB material, PTFE, plastic, rubber, and silicon.

The physical properties of the EBG elements of the second type also determines the dimensions required to obtain attenuation of electromagnetic propagation past the EBG structure. Thus, if the second type of material is chosen to be differently from air, the required dimensions of the first type of EBG element changes. Consequently, a reduced size antenna array can be obtained by varying the choice of material for the first and the second type of element. Advantageously, a reduced size antenna array may be obtained from such a choice.

The EBG elements of the first type may be arranged in a periodic pattern with some spacing. The spaces between the EBG elements of the first type constitute the elements of the second type. In other words, the EBG elements of the first type are interleaved with EBG elements of the second type. Interleaving of the EBG elements of the first and second type can be achieved in one, two or three dimensions.

A size of the EBG elements of either the first or the second type, or both, is smaller than the wavelength in air of electromagnetic radiation in the frequency band. As an example, defining the center frequency as the frequency in the middle of the frequency band, the EBG element size is between ⅕th and ⅕₀th of the wavelength in air of electromagnetic radiation at the center frequency. Here, the EBG element size is interpreted as the size of an EBG element in a direction where the electromagnetic waves are attenuated, e.g. along a surface that acts as a magnetic conductor. As an example, for an EBG element comprising a vertical rod with a circular cross-section and with electromagnetic radiation propagating in the horizontal plane, the size of the EBG element corresponds to a length or diameter of the cross-section of the rod.

The type of EBG structure 128, shown in FIGS. 2, 3, 8, and 9 comprises electrically conductive protrusions 126 on an electrically conductive substrate 127. The protrusions 126 may optionally be encased in a dielectric material. In the example of FIGS. 2, 3, 8, and 9, the electrically conductive protrusions constitute the EBG elements of the first type, and the spaces in-between the protrusions, optionally filled with a non-conductive material, constitute the EBG elements of the second type. It is appreciated that the protrusions 126 may be formed in different shapes. FIGS. 2, 3, 8, and 9 show examples where the protrusions have a square cross-section, but the protrusions may also be formed with a circular, elliptical, rectangular, or more generally shaped cross-section shape.

The protrusions have a length in a direction facing away from the electrically conductive substrate. In general, if the EBG element of the second type is air, the protrusion length corresponds to a quarter of the wavelength in air at the center frequency. The surface along the tops of the protrusions is then close to a perfect magnetic conductor at the center frequency. Even though the protrusions are only a quarter wavelength long at a single frequency, this type of EBG structure still presents a band of frequencies where electromagnetic waves may be attenuated, when the EBG structure faces an electrically conductive surface. In a non-limiting example, the center frequency is 15 GHz and electromagnetic waves in the frequency band 10 to 20 GHz propagating intermediate the EBG structure and the electrically conductive surface are attenuated.

Another type of EBG structure consists of a single slab of electrically conductive material into which cavities have been introduced. The cavities may be air-filled or filled with a non-conductive material. It is appreciated that the cavities may be formed in different shapes. One example is elliptical cross-section holes, but the holes may also be formed with circular, rectangular, or more general cross-section shapes. In one example, the slab constitutes the EBG elements of the first type, and the holes constitute the EBG elements of the second type. In general, the length (in a direction facing away from the electrically conductive substrate) corresponding to a quarter of the wavelength at the center frequency.

As show in FIG. 1, the antenna arrangement 100 optionally comprises a printed circuit board, PCB, layer 130 and a shield layer 140. The PCB layer comprises at least one PCB layer feed. The PCB layer comprises at least one PCB layer feed and faces the distribution layer 120 and the shield layer faces the PCB layer.

The PCB layer 130 optionally comprises at least one RF integrated circuit (IC) arranged on either or both sides of the PCB layer. The at least one PCB layer feed may be arranged to transfer radio frequency signals from the RF IC(s) to an opposite side of the PCB, into the distribution layer. According to an example, the at least one PCB layer feed is a through hole connected to a corresponding opening in the distribution layer 120, wherein the through hole is fed by at least one microstrip line. Alternatively, or in combination of, the at least one PCB layer feed may be arranged to transfer radio frequency signals from RF IC(s) on the side of the PCB facing the distribution layer into the distribution layer. According to aspects, at least one PCB layer feed is arranged to transfer radio frequency signals away the antenna arrangement 100, to, e.g., a modem.

The shield layer 140 optionally comprises a second EBG structure arranged to form at least one second waveguide intermediate the shield layer 140 and the PCB layer 130. The second EBG structure is also arranged to prevent electromagnetic waves (i.e., electromagnetic propagation) in a frequency band of operation from propagating from the at least one second waveguide in directions other than through the at least one PCB layer feed. The second EBG structure allows a compact design with low loss and low leakage, i.e. unwanted electromagnetic propagation between, e.g., adjacent waveguides or between adjacent RFICs. Furthermore, the second EBG structure shields the PCB layer from electromagnetic radiation outside of the antenna arrangement.

The second EBG structure optionally comprises a repetitive structure of protruding elements, and the PCB layer optionally comprises a ground plane and at least one planar transmission line, thereby forming at least one second gap waveguide intermediate the shield layer 140 and the PCB layer 130. The at least one second gap waveguide may, e.g., be an inverted microstrip gap waveguide. The shield layer may comprise different types of protruding elements. For example, narrow and tall pins may be used to form the second waveguide. Wider and shorter pins may be adapted to fit RFICs between the shield layer and the PCB layer. Such pins may contact RFICs for heat transfer purposes.

According to aspects, the distribution layer 120 comprises a third EBG structure, which is arranged on the opposite side of the first EBG structure 128, i.e. the third EBG structure faces the PCB layer 130. This way, gap waveguides may be formed intermediate the distribution layer 120 and the PCB layer 130. These gap waveguides may be used for coupling electromagnetic signals between RFICs on the PCB layer 130 and the PCB layer feeds. The third EBG structure allows a compact design with low loss and low leakage, i.e. unwanted electromagnetic propagation between, e.g., adjacent waveguides or between adjacent RFICs. Furthermore, the third EBG structure shields the PCB layer from electromagnetic radiation outside of the antenna arrangement. The third EBG structure may comprise different pins.

Figure 16:
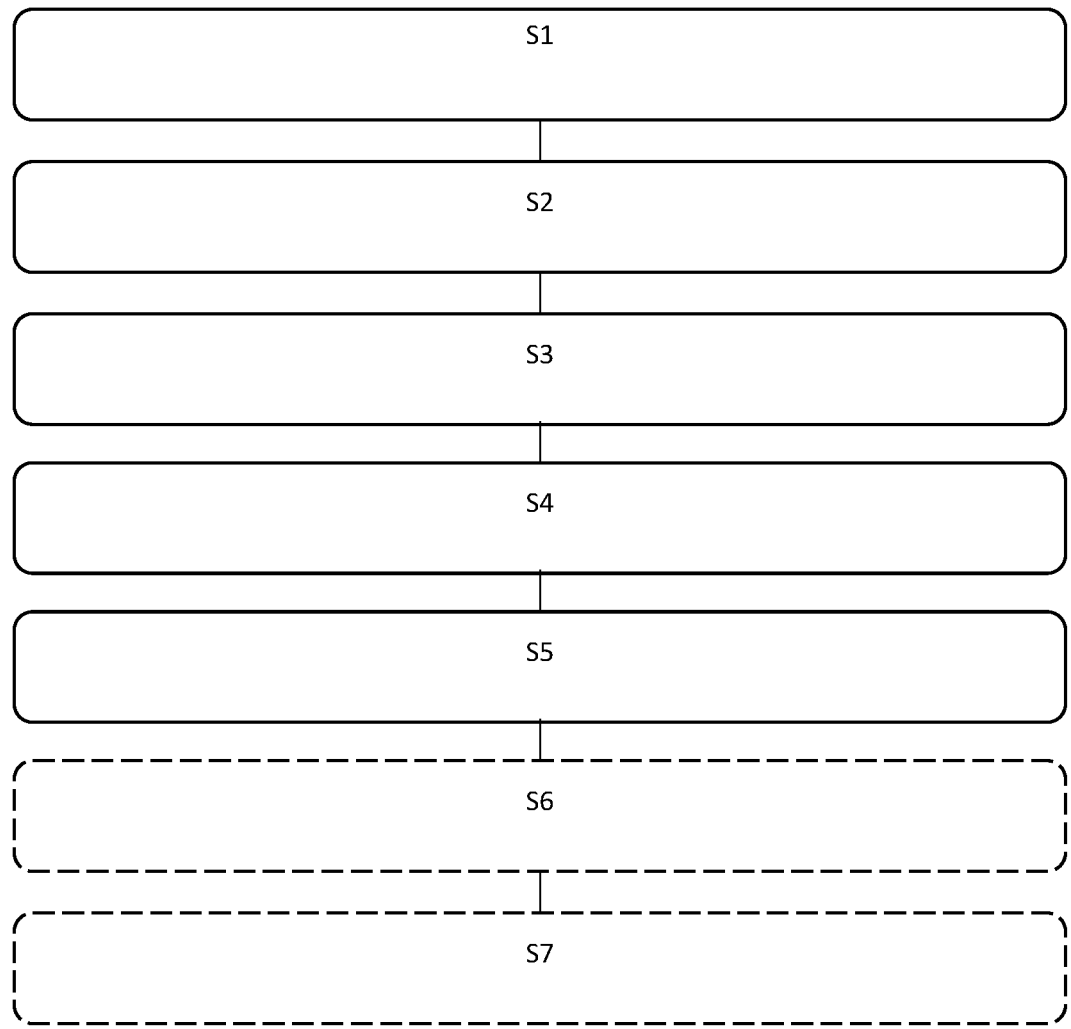
FIG. 16 is a flow chart illustrating methods.

With reference to FIG. 16, there is also disclosed herein a method for designing an antenna arrangement 100 having a stacked layered structure. The antenna arrangement comprises a radiation layer 110 having a surface 113, the surface 113 delimited by a surface boundary 115, and a distribution layer 120 facing the radiation layer 110. The method comprises arranging S1 a first 111 and a second slot 112 extending along a first slot axis D3 and second slot axis D4, respectively, on the surface 113. The method also comprises arranging S2 the distribution layer 120 to distribute a radio frequency signal to the first 111 and second slots 112. The method further comprises arranging S3 a distribution layer feed 122 and a ridge 121 on the distribution layer 120 to form a first ridge waveguide intermediate the distribution layer 120 and the radiation layer 110. The method also comprises connecting S4 a first section 124 of the ridge 121 to a second section 125 via a curved section 123, such that the first section 124 extends along a first ridge axis D1 and the second section 125 extends along a second ridge axis D2 different from the first ridge axis D1. The method further comprises arranging S5 the first slot 111 to face the first section 124 with the first slot offset A1 from the first ridge axis D1 in a direction towards the second ridge axis D2, and arranging the second slot 112 to face the second section 125 with the second slot offset A2 from the second ridge axis D2 in a direction towards the first ridge axis D1.

Optionally, the method further comprises arranging S6 one or more surface current suppressing members 116 on the surface 113, wherein the one or more surface current suppressing members are arranged to suppress a surface current from a slot 111, 112 to the surface boundary 115. The one or more surface current suppressing members 116 may comprise one or more grooves.

Some or all of the steps S1-S6 may be carried out iteratively in an optimization scheme. In step S5, for example, the offsets A1 and A2 can be used as optimization variables in optimization scheme targeting lowest possible SSL. Many different optimization goals are possible, in terms of, e.g., the shape of the radiation pattern. The optimization can be done be simulating different antenna arrangements with different values of the optimization parameter(s).

The method may further comprise arranging S7 a first electromagnetic bandgap, EBG, structure 128 on the distribution layer 120, such that the ridge and the first EBG structure form at least one first ridge gap waveguide intermediate the distribution layer 120 and the radiation layer 110, also such that the first EBG structure prevent electromagnetic waves (i.e., electromagnetic propagation) in a frequency band of operation from propagating from the at least one first ridge gap waveguide in directions other than through the at least one distribution layer feed 122 and the at least two slots 111, 112. Optionally, first EBG structure 128 comprises a repetitive structure of protruding elements 126.

The invention claimed is:

1. An antenna arrangement having a stacked layered structure, the antenna arrangement comprising:
a radiation layer having a surface, the surface delimited by a surface boundary, wherein a first and a second slot extending along a first slot axis and second slot axis, respectively, are arranged on the surface, and
a distribution layer facing the radiation layer, wherein the distribution layer is arranged to distribute a radio frequency signal to the first and second slots, the distribution layer comprising a distribution layer feed and a ridge arranged to form a first ridge waveguide intermediate the distribution layer and the radiation layer,
the ridge comprises a first section connected to a second section via a curved section, the first section extending along a first ridge axis and the second section extending along a second ridge axis different from the first ridge axis, wherein the first slot is arranged facing the first section with the first slot arranged offset from the first ridge axis in a direction towards the second ridge axis, and wherein the second slot is arranged facing the second section with the second slot arranged offset from the second ridge axis in a direction towards the first ridge axis,
wherein a distance from a side wall to the ridge in one of the ridge waveguides, measured in a cross section of the waveguide, varies less than 30 percent along the first ridge waveguide.

2. The antenna arrangement according to claim 1, wherein the curved section arranges the first ridge axis between 0 degrees and 45 degrees relative to the second ridge axis.

3. The antenna arrangement according to claim 1, wherein the first and second slot axes are parallel.

4. The antenna arrangement according to claim 1, wherein the first and second slots have the same slot axis.

5. The antenna arrangement according to claim 1, wherein the first and second ridge axes are parallel.

6. The antenna arrangement according to claim 1, wherein the ridge comprises a first straight section connected to a second straight section.

7. The antenna arrangement according to claim 1, wherein the ridge comprises three or more sections and wherein the radiation layer comprises a respective slot facing each section.

8. The antenna arrangement according to claim 7, wherein every other section of the ridge extends along the same axis.

9. The antenna arrangement according to claim 1, wherein a waveguiding path of the first ridge waveguide is arranged to match the shape of the first ridge.

10. The antenna arrangement according to claim 1, wherein the distribution layer comprises a plurality of ridges.

11. The antenna arrangement according to claim 10, wherein the distribution layer feed is arranged in between two ridges.

12. The antenna arrangement according to claim 1, wherein the distribution layer comprises a first and a second ridge, where the distribution layer feed is arranged in between the first and second ridges, wherein a connection section of the first ridge is arranged offset from a center line of the distribution layer feed, and a connection section of the second ridge is arranged offset from the center line of the distribution layer feed, wherein the connection sections are arranged to guide electromagnetic waves form the distribution layer feed to the respective ridges.

13. The antenna arrangement according to claim 1, comprising one or more surface current suppressing members arranged on the surface, wherein the one or more surface current suppressing members are arranged to suppress a surface current from a slot to the surface boundary.

14. The antenna arrangement according to claim 13, wherein the one or more surface current suppressing members comprise one or more grooves.

15. The antenna arrangement according to claim 1, wherein the distribution layer comprises a first electromagnetic bandgap, EBG, structure, wherein the ridge and the first EBG structure are arranged to form at least one first ridge gap waveguide intermediate the distribution layer and the radiation layer, the first EBG structure also arranged to prevent electromagnetic waves in a frequency band of operation from propagating from the at least one first ridge gap waveguide in directions other than through the at least one distribution layer feed and the at least two slots.

16. The antenna arrangement according to claim 15, wherein the first EBG structure comprises a repetitive structure of protruding elements.

17. The antenna arrangement according to claim 16, comprising a printed circuit board, PCB, layer and a shield layer, wherein the PCB layer comprises at least one PCB layer feed and faces the distribution layer and the shield layer faces the PCB layer.

18. The antenna arrangement according to claim 17, wherein the shield layer comprises a second EBG structure arranged to form at least one second waveguide intermediate the shield layer and the PCB layer, the second EBG structure also arranged to prevent electromagnetic waves in a frequency band of operation from propagating from the at least one second wave guide in directions other than through the at least one PCB layer feed.

19. The antenna arrangement according to claim 18, wherein the second EBG structure comprises a repetitive structure of protruding elements, and wherein the PCB layer comprises a ground plane and at least one planar transmission line, thereby forming at least one second gap waveguide intermediate the shield layer and the PCB layer.

20. A telecommunication or radar transceiver comprising the antenna arrangement according to claim 1.

21. A vehicle comprising the antenna arrangement according to claim 1.

22. A method for designing an antenna arrangement having a stacked layered structure, the antenna arrangement comprising a radiation layer having a surface, the surface delimited by a surface boundary, and a distribution layer facing the radiation layer, the method comprising:

arranging a first and a second slot extending along a first slot axis and second slot axis, respectively, on the surface, arranging the distribution layer to distribute a radio frequency signal to the first and second slots, arranging a distribution layer feed and a ridge on the distribution layer to form a first ridge waveguide intermediate the distribution layer and the radiation layer, connecting a first section of the ridge to a second section via a curved section, such that the first section extends along a first ridge axis and the second section extends along a second ridge axis different from the first ridge axis, arranging the first slot to face the first section with the first slot offset from the first ridge axis in a direction towards the second ridge axis, and arranging the second slot to face the second section with the second slot offset from the second ridge axis in a direction towards the first ridge axis, wherein a distance from a side wall to the ridge in one of the ridge waveguides, measured in a cross section the waveguide, varies less than 30 percent along the first ridge waveguide.

23. The method according to claim 22, further comprising:

arranging one or more surface current suppressing members on the surface, wherein the one or more surface current suppressing members are arranged to suppress a surface current from a slot to the surface boundary.

24. The method according to claim 23, wherein the one or more surface current suppressing members comprise one or more grooves.

25. The method according to claim 22, further comprising: arranging a first electromagnetic bandgap, EBG, structure on the distribution layer, such that the ridge and the first EBG structure form at least one first ridge gap waveguide intermediate the distribution layer and the radiation layer, also such that the first EBG structure prevent electromagnetic waves in a frequency band of operation from propagating from the at least one first ridge gap waveguide in directions other than through the at least one distribution layer feed and the at least two slots.

26. The method according to claim 25, wherein the first EBG structure comprises a repetitive structure of protruding elements.

27. An antenna arrangement having a stacked layered structure, the antenna arrangement comprising:

a radiation layer having a surface, the surface delimited by a surface boundary, wherein a first and a second slot extending along a first slot axis and second slot axis, respectively, are arranged on the surface, and a distribution layer facing the radiation layer, wherein the distribution layer is arranged to distribute a radio frequency signal to the first and second slots, the distribution layer comprising a distribution layer feed and a ridge arranged to form a first ridge waveguide intermediate the distribution layer and the radiation layer, the ridge comprises a first straight section connected to a second straight section via a curved section, the first straight section extending along a first ridge axis and the second straight section extending along a second ridge axis different from the first ridge axis, wherein the first slot is arranged facing the first straight section with the first slot arranged offset from the first ridge axis in a direction towards the second ridge axis, and wherein the second slot is arranged facing the second straight section with the second slot arranged offset from the second ridge axis in a direction towards the first ridge axis, wherein the first and second slots have the same slot axis.

28. An antenna arrangement having a stacked layered structure, the antenna arrangement comprising:
 a radiation layer having a surface, the surface delimited by a surface boundary, wherein a first and a second slot extending along a first slot axis and second slot axis, respectively, are arranged on the surface, and
 a distribution layer facing the radiation layer, wherein the distribution layer is arranged to distribute a radio frequency signal to the first and second slots, the distribution layer comprising a distribution layer feed and a ridge arranged to form a first ridge waveguide intermediate the distribution layer and the radiation layer, the ridge comprises a first section connected to a second section via a curved section, the first section extending along a first ridge axis and the second section extending along a second ridge axis different from the first ridge axis, wherein the first slot is arranged facing the first section with the first slot arranged offset from the first ridge axis in a direction towards the second ridge axis, and wherein the second slot is arranged facing the second section with the second slot arranged offset from the second ridge axis in a direction towards the first ridge axis, wherein the first and second slots have the same slot axis and wherein the ridge comprises a first straight section connected to a second straight section, wherein the ridge comprises three or more sections and wherein the radiation layer comprises a respective slot facing each section.

* * * * *